(12) United States Patent
Neace, Jr. et al.

(10) Patent No.: US 12,318,032 B2
(45) Date of Patent: *Jun. 3, 2025

(54) COLD BREW BEVERAGE BREWING SYSTEMS

(71) Applicant: BL Patents, LLC, Lake Oswego, OR (US)

(72) Inventors: Robert Neace, Jr., Vancouver, WA (US); Todd H. Maas, Lake Oswego, OR (US)

(73) Assignee: BL Patents, LLC, Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,918

(22) Filed: May 27, 2023

(65) Prior Publication Data

US 2023/0301456 A1    Sep. 28, 2023

Related U.S. Application Data

(63) Continuation of application No. 16/357,215, filed on Mar. 18, 2019, now Pat. No. 11,659,952, which is a continuation of application No. 16/005,608, filed on Jun. 11, 2018, now Pat. No. 10,231,566, which is a continuation of application No. 13/842,518, filed on Mar. 15, 2013, now Pat. No. 9,999,314, which is a (Continued)

(51) Int. Cl.
*A47J 31/16* (2006.01)
*A47J 31/06* (2006.01)
*A47J 31/18* (2006.01)
*A47J 31/46* (2006.01)

(52) U.S. Cl.
CPC ......... *A47J 31/0615* (2013.01); *A47J 31/16* (2013.01); *A47J 31/18* (2013.01); *A47J 31/467* (2013.01)

(58) Field of Classification Search
CPC .................. A47J 31/16; A47J 31/18
USPC ........................................... 99/296
See application file for complete search history.

(56) References Cited

U.S. PATENT DOCUMENTS

| 22,278 A | 12/1858 | Culver |
| 25,909 A | 10/1859 | Neilson |

(Continued)

FOREIGN PATENT DOCUMENTS

| DE | 604479 A1 | 10/1934 |
| FR | 560252 A1 | 10/1923 |

OTHER PUBLICATIONS

The Wall Street Journal; An Iced Coffee Maker; Martelli Pasta; and Fruit-Based Vinegars; www.djreprints.com; Jul. 26, 2013; Dow Jones & Company, Inc., USA; 2 pages.

(Continued)

*Primary Examiner* — Reginald Alexander
(74) *Attorney, Agent, or Firm* — Law Office of Karen Dana Oster, LLC

(57) ABSTRACT

A cold brew coffee apparatus has a first container, a second container, a centerpiece connector, and a filter. Preferably, the filter is positionable within the first container such that it divides the filter interior volume from the remainder of the first container interior volume. Preferably, cold brew infusion occurs when water in the first container interior volume passes through the water-permeable barrier and soaks coffee grounds within the filter interior volume to form a soluble coffee extract. An alternative cold brew coffee apparatus includes only a single brew chamber and a filter.

19 Claims, 41 Drawing Sheets

Related U.S. Application Data continuation-in-part of application No. 12/030,150, filed on Feb. 13, 2008, now Pat. No. 8,720,321, which is a continuation-in-part of application No. 11/406,742, filed on Apr. 18, 2006, now Pat. No. 7,858,133.

(60) Provisional application No. 60/672,591, filed on Apr. 18, 2005.

(56) References Cited

U.S. PATENT DOCUMENTS

| | | |
|---|---|---|
| 91,787 A | 6/1869 | Stout |
| 346,774 A | 8/1886 | Ribbeok |
| 385,880 A | 7/1888 | Racer |
| 451,862 A | 5/1891 | Moncrieff |
| 603,700 A | 5/1898 | Mitchell |
| 707,937 A | 8/1902 | Nutrizio |
| 1,051,701 A | 1/1913 | Delgado |
| 2,263,610 A | 11/1941 | Cain |
| 2,263,881 A | 11/1941 | Kors |
| 2,401,529 A | 6/1946 | Varney |
| 2,732,787 A | 1/1956 | Osborne |
| 2,851,185 A | 9/1958 | Taylor |
| 2,878,746 A | 3/1959 | Schwinger |
| 2,897,970 A | 8/1959 | Schlumbohm |
| 3,215,060 A | 11/1965 | Perlov |
| D203,854 S | 2/1966 | Douglas |
| D205,678 S | 9/1966 | Williams |
| 3,334,574 A | 8/1967 | Douglas |
| 3,336,857 A | 8/1967 | Knodt et al. |
| 3,707,842 A | 1/1973 | Spivak |
| 4,051,264 A | 9/1977 | Sanderson et al. |
| 4,112,830 A | 9/1978 | Saito |
| D250,804 S | 1/1979 | Nilsson |
| 4,143,590 A | 3/1979 | Kasakoff |
| 4,226,829 A | 10/1980 | Mike |
| 4,278,691 A | 7/1981 | Donarumma et al. |
| D261,389 S | 10/1981 | Pilla |
| 4,374,026 A | 2/1983 | Greutert |
| D271,215 S | 11/1983 | Hinkle |
| 4,443,481 A | 4/1984 | Donarumma et al. |
| 4,622,230 A | 11/1986 | Stone, Jr. |
| 4,721,835 A | 1/1988 | Welker |
| D321,669 S | 11/1991 | Hoehne |
| 5,104,666 A | 4/1992 | Sanvitale |
| 5,125,327 A | 6/1992 | Winnington-Ingram |
| 5,453,189 A | 9/1995 | Joergensen |
| 5,605,710 A | 2/1997 | Pridonoff et al. |
| 5,664,480 A | 9/1997 | DiFilippo |
| 5,836,179 A | 11/1998 | van Laar |
| 5,852,966 A | 12/1998 | Hursh |
| D442,009 S | 3/2001 | Schwarzli |
| 6,761,918 B2 | 7/2004 | Pulikkottil et al. |
| 6,805,040 B1 | 10/2004 | Chang et al. |
| 6,805,042 B2 | 10/2004 | Mordini et al. |
| 6,912,949 B2 | 7/2005 | Brizio |
| D521,329 S | 5/2006 | Bodum |
| D557,977 S | 12/2007 | Neace et al. |
| D598,706 S | 8/2009 | Neace et al. |
| D606,805 S | 12/2009 | Neace et al. |
| 7,858,133 B2 | 12/2010 | Neace, Jr. et al. |
| 7,958,816 B2 | 6/2011 | Lin |
| 8,720,321 B2 | 5/2014 | Neace, Jr. et al. |
| D733,496 S | 7/2015 | Pisarevsky |
| D766,655 S | 9/2016 | Neace, Jr. |
| D778,173 S | 2/2017 | Pisarevsky |
| D795,011 S | 8/2017 | Pisarevsky |
| D796,901 S | 9/2017 | Pisarevsky |
| 9,821,946 B2 | 11/2017 | Pisarevsky |
| D806,475 S | 1/2018 | Pisarevsky |
| D806,566 S | 1/2018 | Pisarevsky |
| 9,856,053 B2 | 1/2018 | Pisarevsky |
| D812,992 S | 3/2018 | Pisarevsky |
| 9,924,827 B2 | 3/2018 | Simpson |
| 9,993,011 B2 | 6/2018 | Feber |
| 9,999,314 B1 | 6/2018 | Neace et al. |
| D823,049 S | 7/2018 | Neace, Jr. |
| D823,050 S | 7/2018 | Neace, Jr. |
| D823,052 S | 7/2018 | Neace, Jr. |
| D823,053 S | 7/2018 | Neace, Jr. |
| D832,058 S | 10/2018 | Pisarevsky |
| 10,231,566 B2 | 3/2019 | Neace, Jr. et al. |
| 10,278,534 B2 | 5/2019 | Miller |
| D856,730 S | 8/2019 | Pisarevsky |
| 10,729,275 B2 | 8/2020 | Pisarevsky |
| 11,013,359 B2 | 5/2021 | Kim |
| 11,659,952 B2 | 5/2023 | Neace, Jr. et al. |
| 2003/0000887 A1 | 1/2003 | Zaske |
| 2003/0209151 A1 | 11/2003 | Mordini et al. |
| 2006/0162572 A1 | 7/2006 | Chiu Liu et al. |
| 2012/0234182 A9 | 9/2012 | Neace, Jr. et al. |
| 2017/0166385 A1 | 6/2017 | Pisarevsky |

OTHER PUBLICATIONS

Toddy, Llc; various web page printouts related to the Toddy Cold Brew System; @2003-2013 Toddy, LLC; www.toddycafe.com; United States of America; 6 pages.
FELLOW; "Duo Coffee Steeper" Kickstarter Project; Dec. 21, 2013; www.kickstarter.com; United States of America; 11 pages.
FELLOW; "If Coffee Could Speak, It Would Be Speechless"; Fellow Duo Coffee Steeper; at least as early as May 7, 2018; www.fellowproducts.com/duo; United States of America; 6 pages.
ASOBU; "Asobu@ Coldbrew Insulated Portable Brewer" Kickstarter Project; Aug. 20, 2017; www.kickstarter.com; United States of America; 13 pages.
KICKSTARTER; "BRUW-Cold Brew, Simplified"; funding period Nov. 23, 2015 to Dec. 23, 2015; https://www.kickstarter.com/projects/feber/bruw-cold-brew-simplified; at least as early as Jan. 21, 2019; 7 pages.
Shark Tank Blog; "Bruw"; www.sharktankblog.com/business/bruw; at least as early as Jan. 21, 2019; 4 pages.
All Shark Tank Products; "Bruw Cold Brew Coffee Filtering"; https://allsharkproducts.com/shark-tank-products-home/bruw-cold-brew-coffee-filtering; at least as early as Jan. 21, 2019; 4 pages.
Shark Tank; "Welcome to Bruw"; https://www.bruw.net; at least as early as Jan. 21, 2019; 9 pages.
Shark Tank; "How to Bruw"; https://www.bruw.net/pages/how-to-bruw; at least as early as Jan. 21, 2019; 1 page.
Bruw; "Mason Jar Cold Brew Coffee Filter"; https://www.bruw.net/.products/the-bruw-filter; at least as early as Jan. 21, 2019; 3 pages.
Shark Tank Blog; "Bruw-Cold Brew Coffee Maker"; www.sharktankblog.com/bruw-cold-brew-coffee-maker; at least as early as Jan. 21, 2019; 3 pages.
FR560252; E-Space Machine Translation of FR560252; Apr. 28, 2023; 2 pages.
DE604479; Google Translate Machine Translation of DE604479; Apr. 28, 20238; 2 pages.
Neace et al.; U.S. Appl. No. 60/672,591, filed Apr. 18, 2005 and Apr. 18, 2005 USPTO Electronic Acknowledgement Receipt; 16 pages.
Pisarevsky; U.S. Appl. No. 62/470,963, filed Mar. 14, 2017 and Mar. 22, 2017 Filing Receipt; 6 pages.
Pisarevsky; U.S. Appl. No. 62/533,162, filed Jul. 17, 2017 and Jul. 21, 2017 Filing Receipt; 8 pages.
Pisarevsky; U.S. Appl. No. 62/594,706, filed Dec. 5, 2017 and Dec. 20, 2017 Filing Receipt; 28 pages.
Pisarevsky; U.S. Appl. No. 62/611,032, filed Dec. 28, 2017 and Jan. 16, 2018 Filing Receipt; 9 pages.

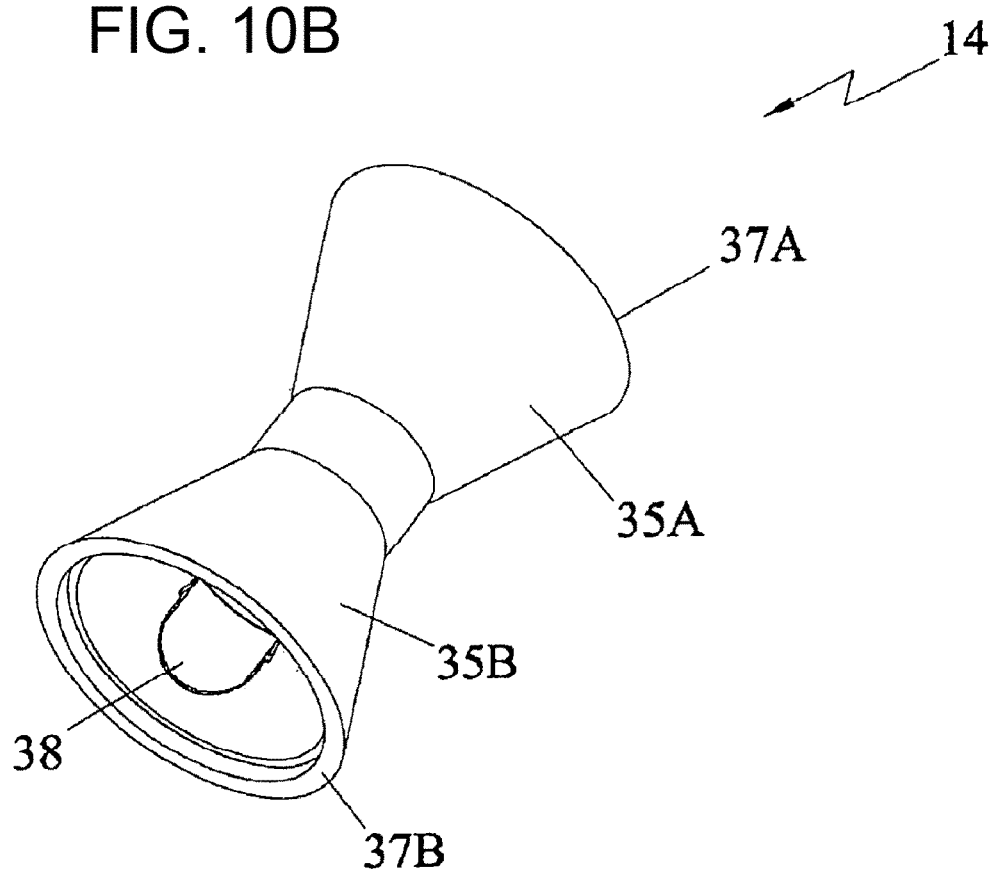

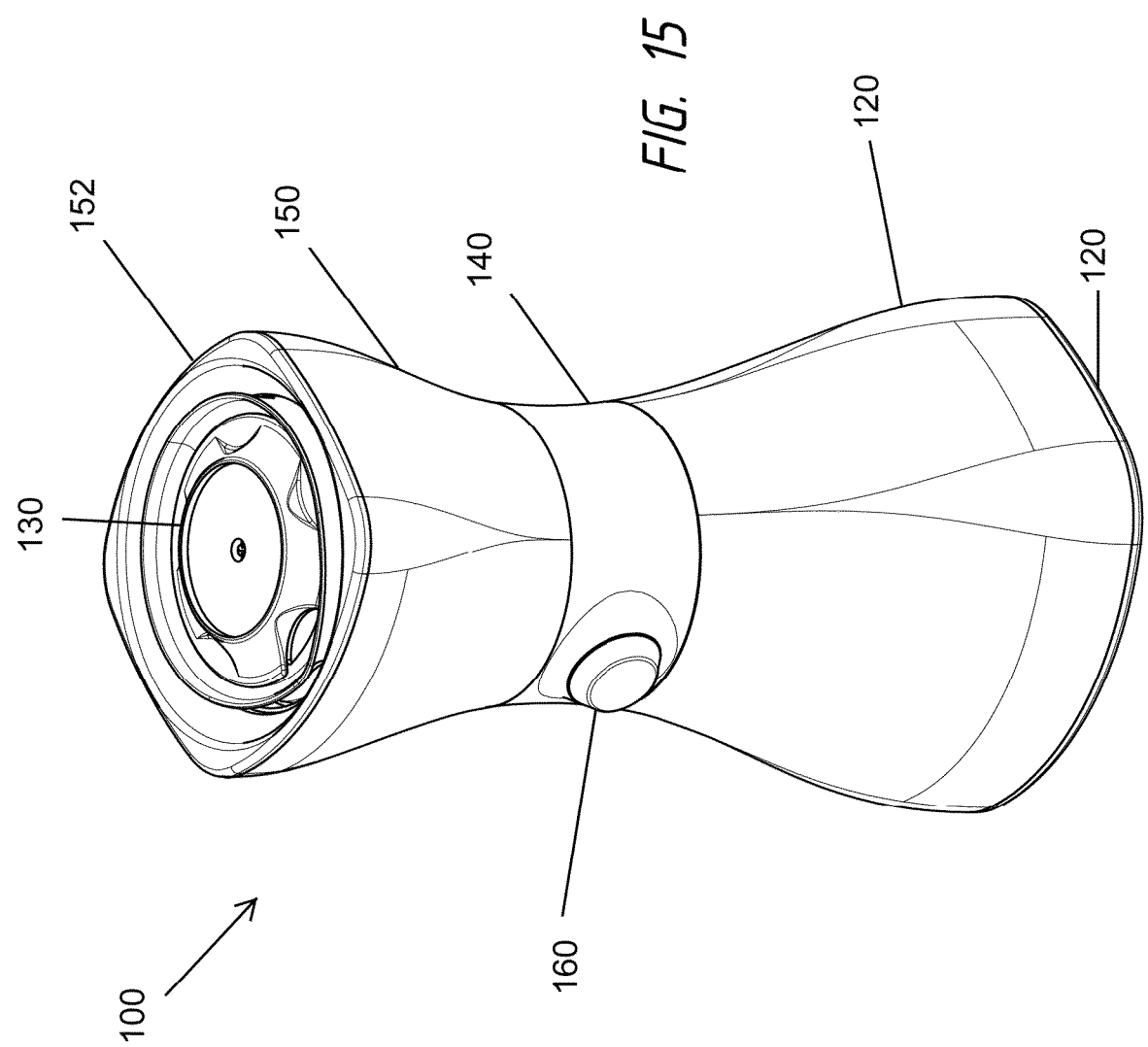

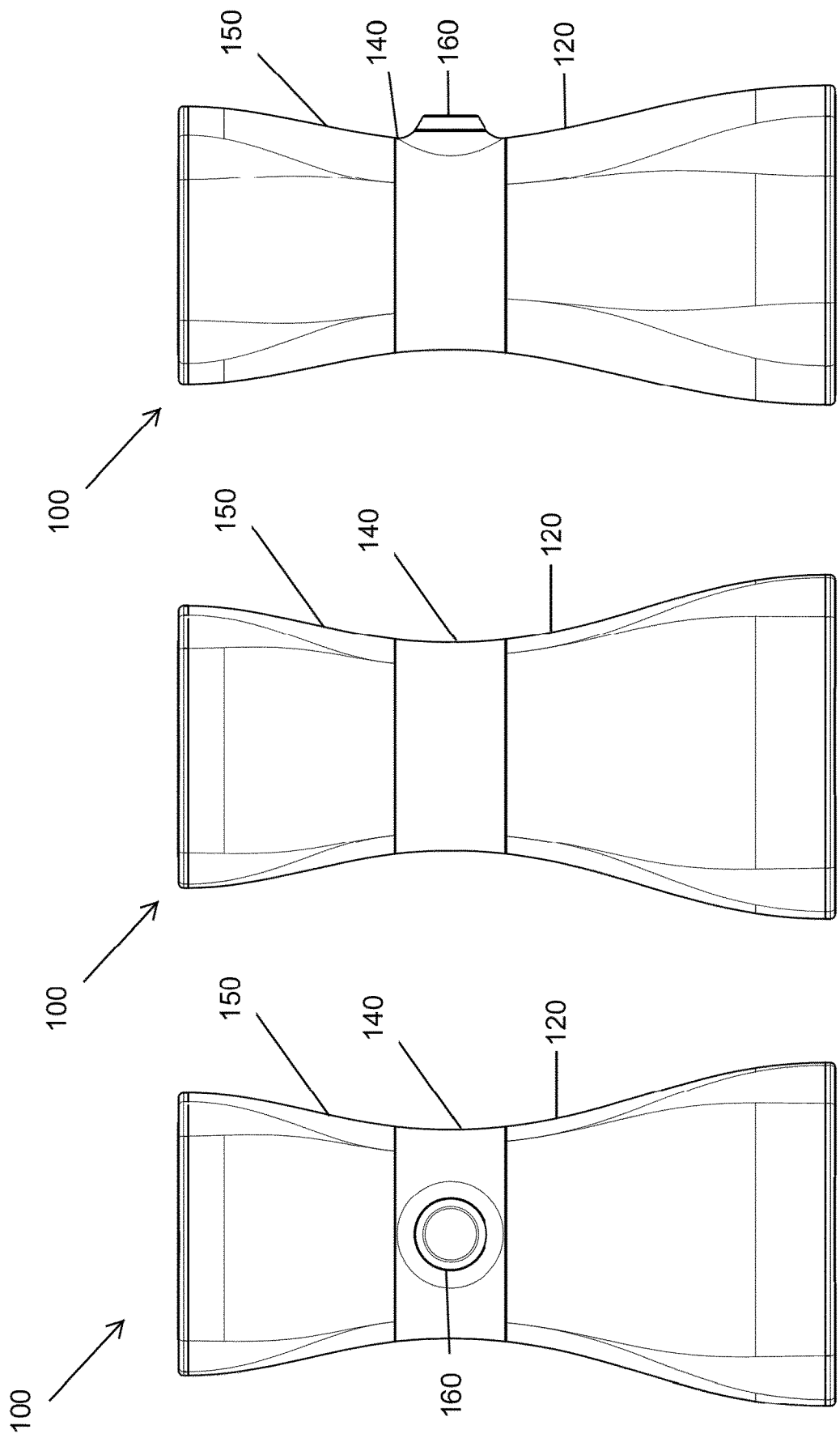

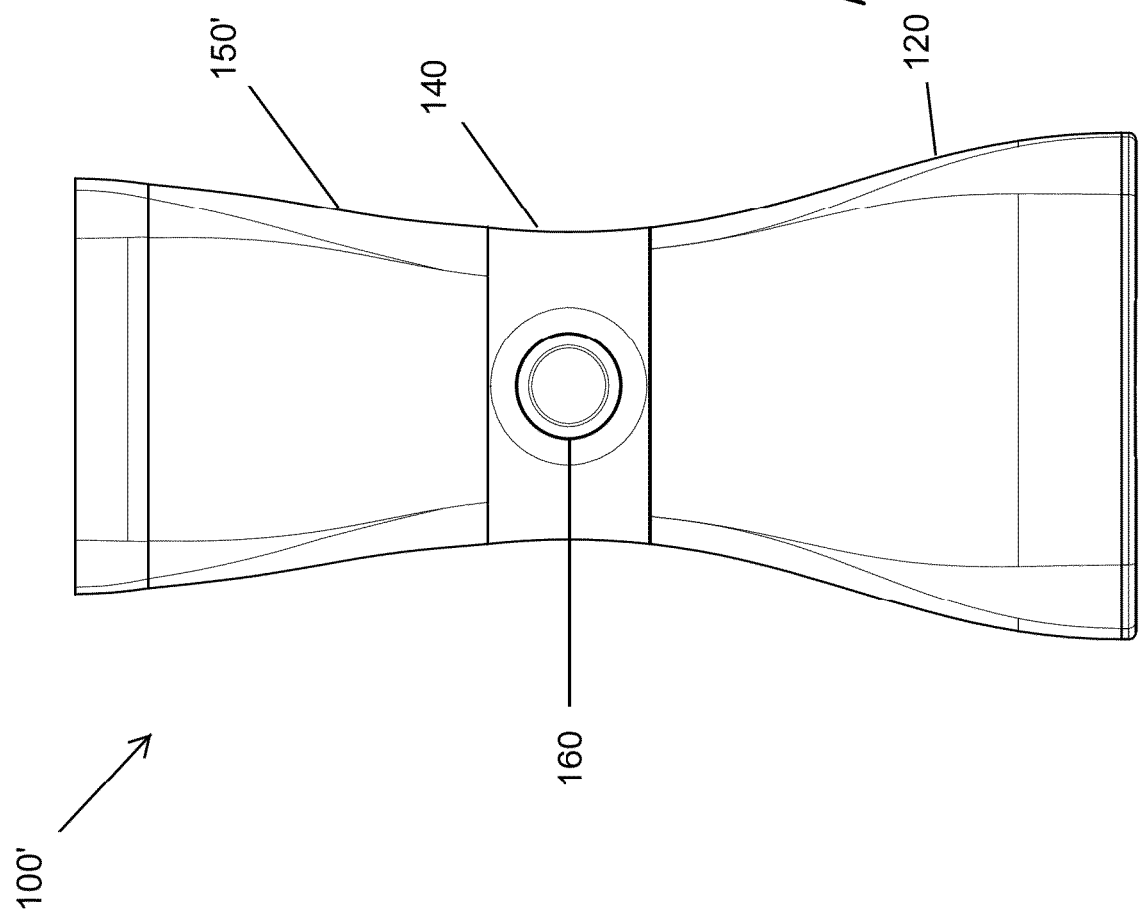

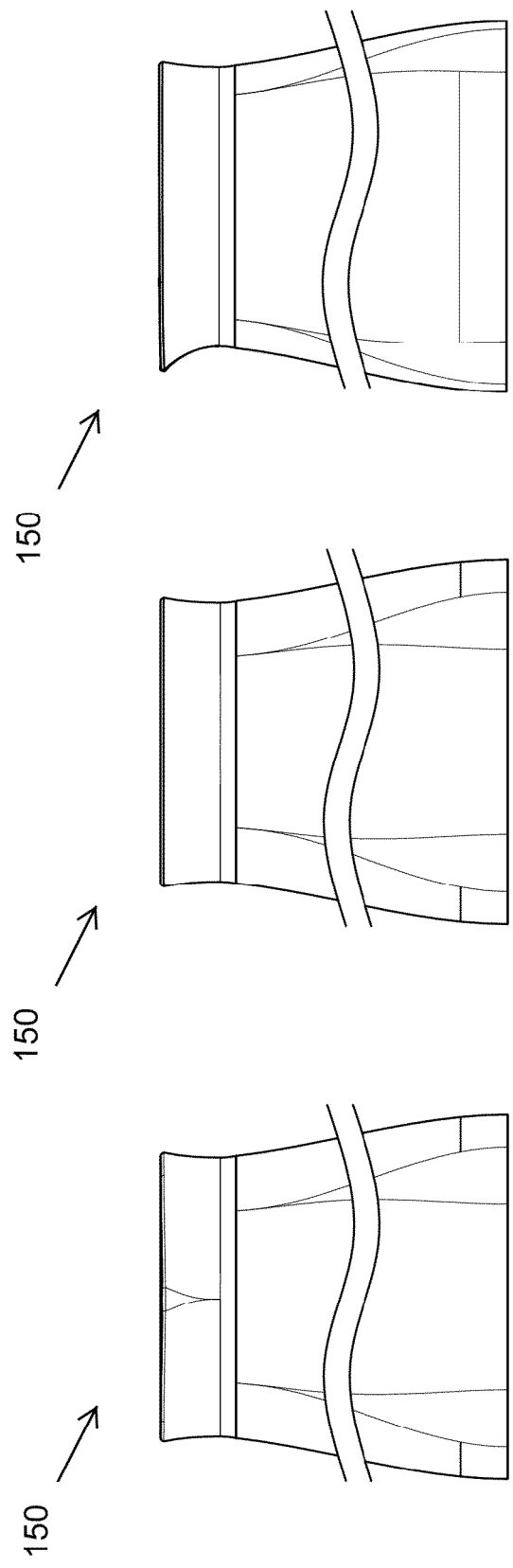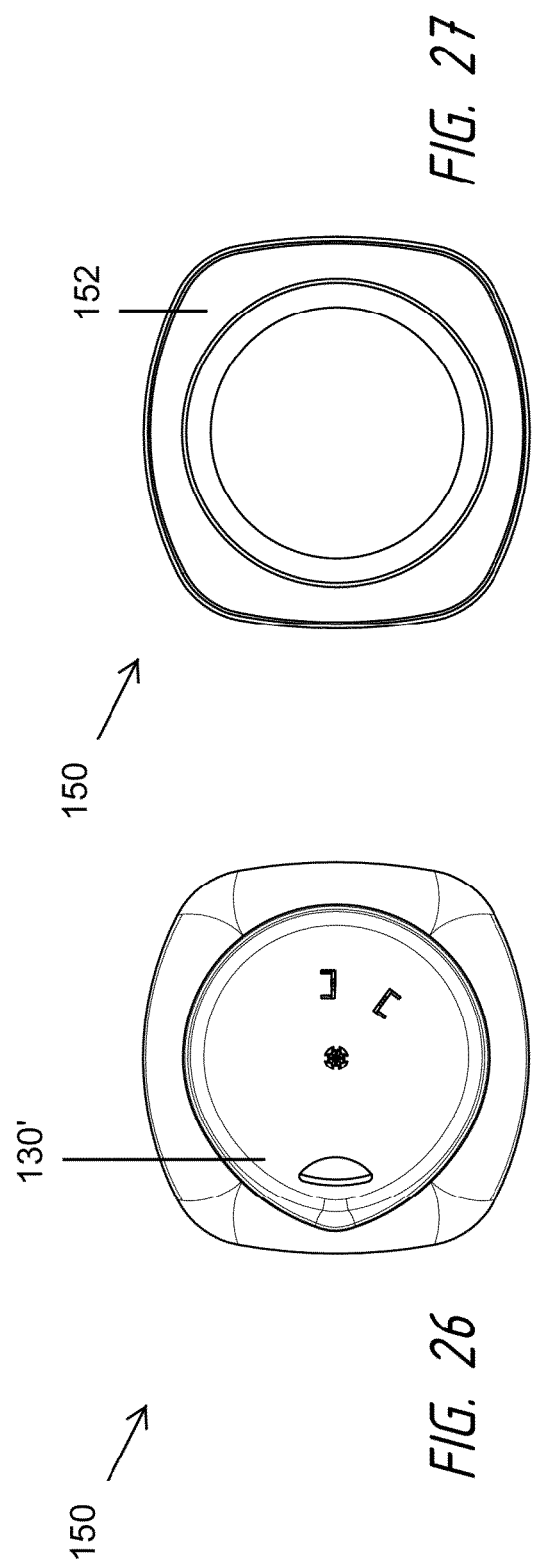

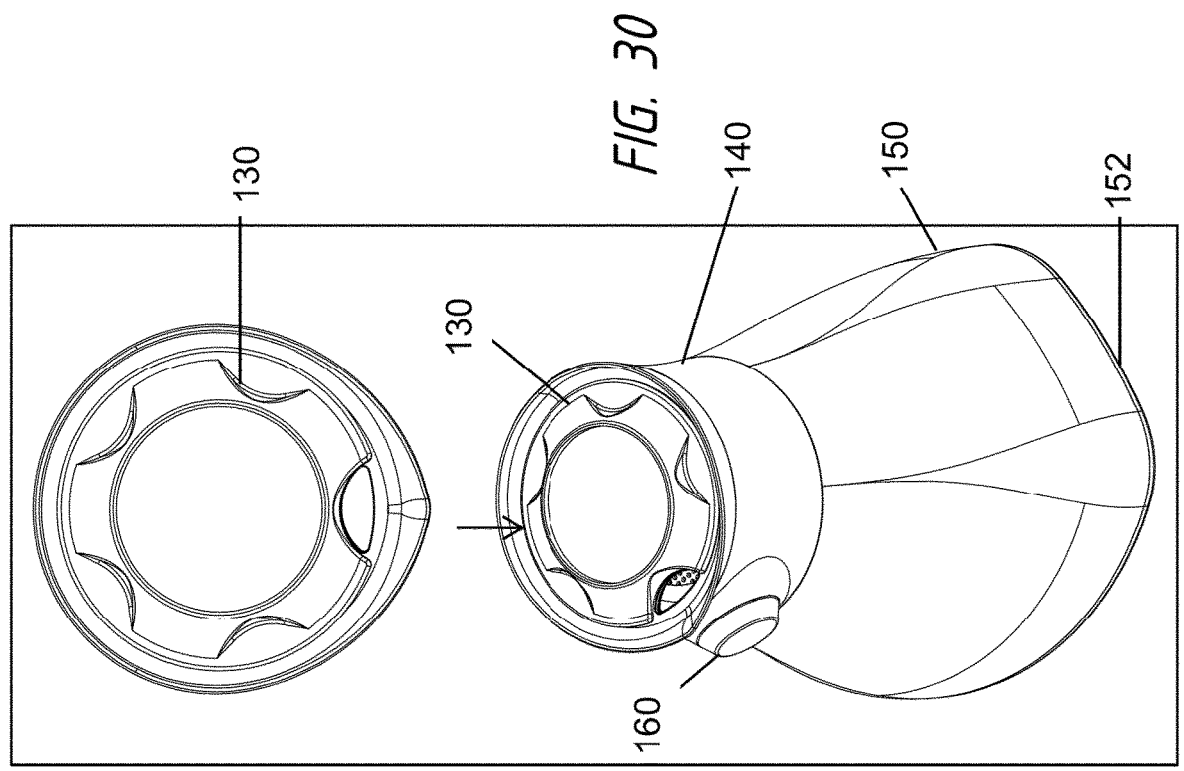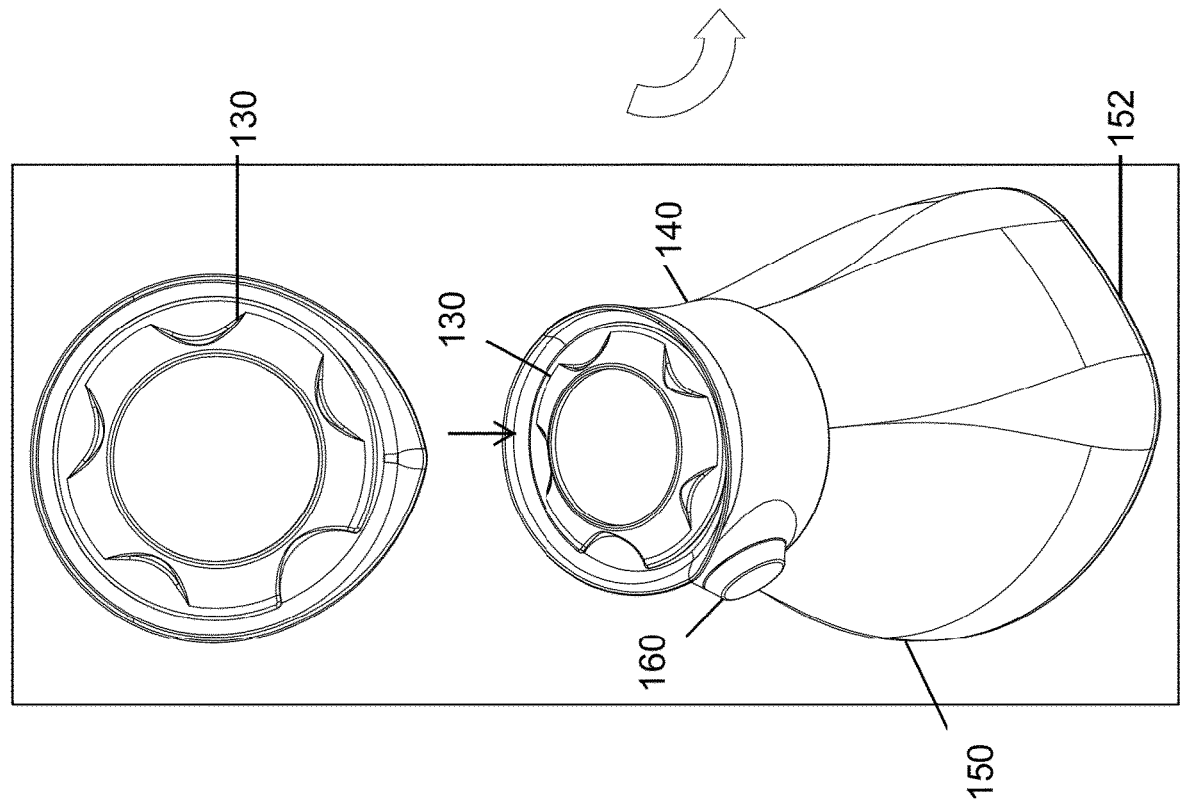

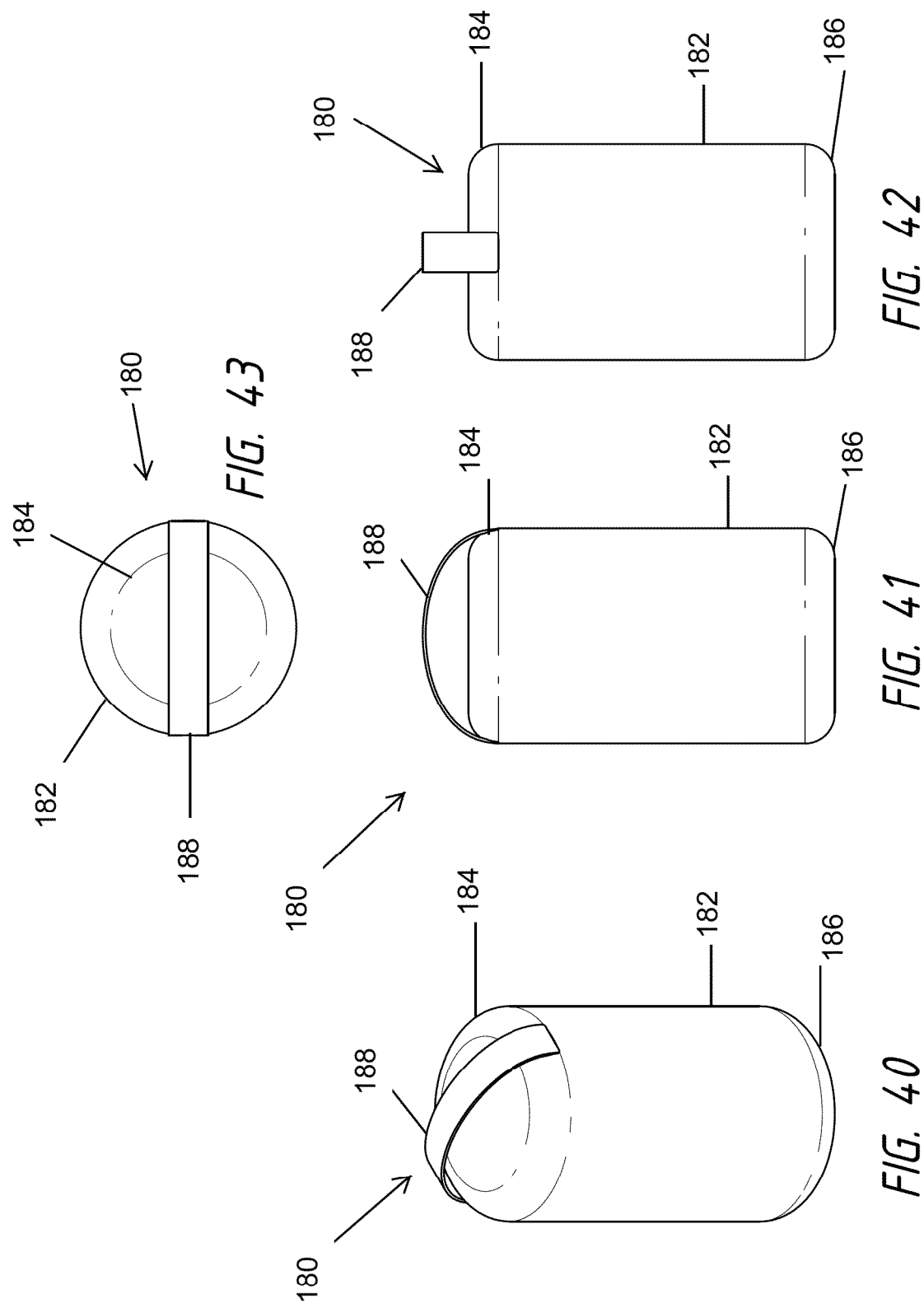

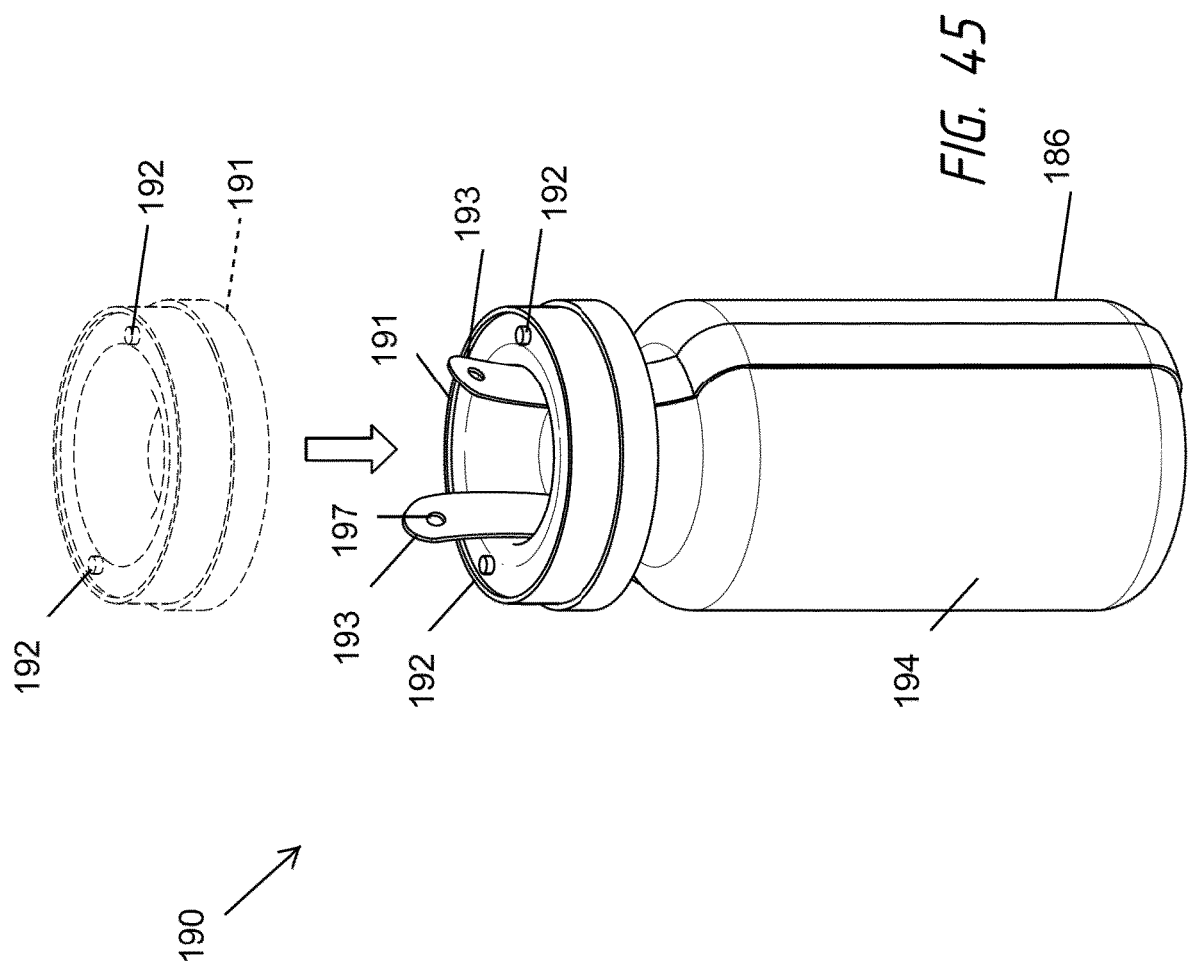

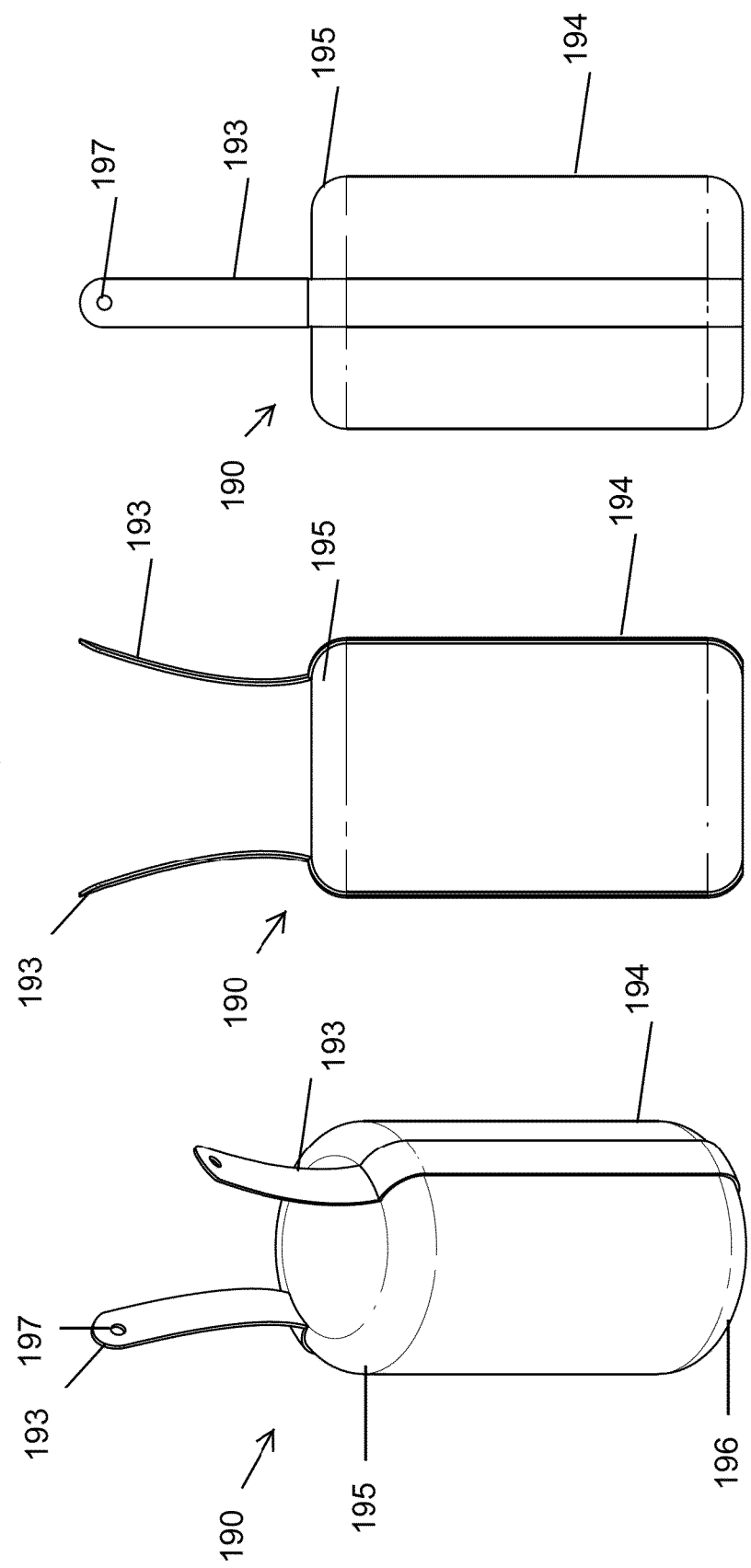

COLD BREW BEVERAGE BREWING SYSTEMS

The present application is a continuation of U.S. patent application Ser. No. 16/357,215, filed Mar. 18, 2019. U.S. patent application Ser. No. 16/357,215 is a continuation of U.S. patent application Ser. No. 16/005,608, filed Jun. 11, 2018, now U.S. Pat. No. 10,231,566. U.S. patent application Ser. No. 16/005,608 is a continuation of U.S. patent application Ser. No. 13/842,518, filed Mar. 15, 2013, now U.S. Pat. No. 9,999,314. U.S. patent application Ser. No. 13/842,518 is a continuation-in-part of U.S. patent application Ser. No. 12/030,150, filed Feb. 13, 2008, now U.S. Pat. No. 8,720,321. U.S. patent application Ser. No. 12/030,150 is a continuation-in-part of U.S. patent application Ser. No. 11/406,742, filed Apr. 18, 2006, now U.S. Pat. No. 7,858,133. U.S. patent application Ser. No. 11/406,742 is an application claiming the priority from U.S. Provisional Patent Application No. 60/672,591, filed Apr. 18, 2005. The present application is based on and claims priority from these applications, the disclosures of which are hereby expressly incorporated herein by reference.

BACKGROUND OF THE INVENTION

Described herein are improved cold brew beverage brewing systems and, more specifically, improved cold brew beverage brewing systems for producing soluble beverage (e.g. coffee) extract using cold brew infusion that include a brew chamber, an extract chamber, and a centerpiece connector therebetween.

Apparatuses for brewing coffee are well known. Coffee is customarily drip-brewed using heated water. Water is heated in a vessel, and then poured over a container of ground coffee. As the water mingles with the grounds, a coffee extract is produced that drips through a filter into a coffee pot or cup. Also known are machines that automatically heat water and brew coffee in one self-contained device.

Although coffee is traditionally brewed in hot or boiling water, it is also possible to cold brew coffee. A preference for cold brewed coffee has developed, principally due to its flavor. Since many of the bitter oils and acids contained in coffee are soluble only at high temperature, coffee brewed with hot or boiling water can be characterized by a harsh acidic taste. Cold brewed coffee avoids this problem. As the preference for cold brewed coffee has grown, several developments in the cold brew process have been made.

U.S. Pat. No. 4,051,264 to Sanderson discloses a process for obtaining a cold water extract from tea leaves. The process involves treating fresh green tea leaves with an enzyme additive to produce dry tea leaves that are cold water extractable. In addition, U.S. Pat. No. 6,761,918 to Pulikkottil discloses a method of processing green tea leaves to produce black tea particles that can be brewed in cold water.

U.S. Pat. No. 2,878,746 discloses a cold water coffee brewer having a large canister into which coffee grounds are placed and through which cold water is circulated. The '746 device is designed to infuse cold water with coffee. The '746 device achieves the infusion through a drip mechanism by forcing the aqueous solution up through a pipe and onto a series of foraminous shelves. U.S. Pat. No. 4,112,830 discloses a device that uses cold water to obtain an extraction that is complex and difficult to clean.

BRIEF SUMMARY OF THE INVENTION

Known cold brewing methods and devices are either meant for brewing substances other than coffee, or they are structurally different from the present invention, and are designed for a different type of process. Therefore, it is an object of the present invention to provide an improved apparatus for cold brewing coffee to produce a liquid extract or infusion that can be used to brew coffee or be stored. A further object of the present invention is to provide an improved cold brew coffee apparatus that is fully invertible wherein the apparatus is of hourglass shape/design to facilitate brewing and dispensing. A further object of the present invention is to provide an improved cold brew coffee apparatus wherein a unique coffee filter system is free standing and integrates into the brew chamber easily and with no mess. Finally, it is an objective of the present invention is to provide an improved cold brew coffee apparatus which is a fully enclosed system, whereby coffee grounds are brewed in cold water for an extended period of time for better taste and flavor and the resulting extract can be stored in a refrigerator for up to two weeks.

Described herein is a cold brew coffee apparatus having a first container, a second container, a centerpiece connector, and a filter. The first container preferably has a first container interior volume, a first container bottom surface, and a first container opening remote from the first container bottom surface. The second container preferably has a second container interior volume, a second container bottom surface, and a second container opening remote from the second container surface. The centerpiece connector preferably has a centerpiece connector first opening end and a centerpiece connector second opening end, the centerpiece connector first opening end for associating with the first container opening to form the water impermeable seal, the centerpiece connector second opening end for associating with the second container opening to form the water impermeable seal. The filter preferably has a water-permeable barrier, the filter defining a filter interior volume and sized to fit within the first container interior volume through the first container opening. Preferably the filter is positionable within the first container such that it divides the filter interior volume from the remainder of the first container interior volume. Preferably, cold brew infusion occurs when water in the first container interior volume passes through the water-permeable barrier and soaks coffee grounds within the filter interior volume to form a soluble coffee extract.

It should be noted that the centerpiece connector preferably allows liquid to flow between the centerpiece connector first opening end and the centerpiece connector second opening end to allow liquid to flow between the first container and the second container. The centerpiece connector preferably has an annular interior shoulder between the centerpiece connector first opening end and the centerpiece connector second opening end. The centerpiece connector preferably has a screen filter positioned between the centerpiece connector first opening end and the centerpiece connector second opening end. The screen filter may be offset from the peripheral edge of the centerpiece connector by the annular interior shoulder.

The cold brew coffee apparatus may further include a cap, the cap associateable with either or both of the first container bottom surface or the second container bottom surface. The association may be a nesting association.

The filter may be associateable with the centerpiece connector. If the filter is a direct-grind filter and has an opening, the opening of the filter may be associateable with the centerpiece connector. If a filter frame with an opening is used with a pod filter, the opening of the filter frame may be associateable with the centerpiece connector. If a ring-shaped pod lock is used with a pod filter, the ring-shaped pod lock may be associateable with the centerpiece connector.

An alternative cold brew coffee apparatus described herein includes a brew chamber and a filter. The brew chamber preferably has a brew chamber interior volume, a brew chamber bottom surface, and a brew chamber opening remote from the brew chamber bottom surface. The filter preferably provides a water-permeable barrier, the filter defining a filter interior volume, the filter sized to fit within the brew chamber interior volume through the brew chamber opening. The filter is positionable within the brew chamber such that it divides the filter interior volume from the remainder of the brew chamber interior volume. Cold brew infusion occurs when water in the brew chamber interior volume passes through the water-permeable barrier and soaks coffee grounds within the filter interior volume to form a soluble coffee extract.

Described herein is an improved apparatus for brewing coffee to produce a liquid extract/concentrate that can be brewed in cold water and which can be stored fresh in the refrigerator for up to two weeks. The apparatus solves the inherent problems of hot brew methods that produce a bitter, acidic coffee, and improves the art of cold brewing. The cold brew coffee apparatus has a filter or a filter assembly (used interchangeably herein as "filter" unless otherwise specified), a centerpiece connector, a brew chamber and an extract chamber. When a filter assembly is used, the filter assembly has an outer cup, a hollow inner housing and a water-permeable barrier secured between the outer cup and inner housing. The water-permeable barrier is exposed between the side walls of the outer cup and inner housing. When a centerpiece connector is present, it is hollow and has two conical extremities connected by a narrow midsection. The extract chamber may be the same size as the brew chamber, and is mounted to the end of the centerpiece connector, when present, opposite the brew chamber.

To brew coffee, the filter is securely placed on a flat surface on its base and filled with coffee grounds. The brew chamber is then inverted so that its open end fits over the filter. The brew chamber is securely pressed onto the rim of the filter forming a hermetic seal between the brew chamber and the filter. The brew chamber having the secured filter is again inverted and made to stand on its base so that the filter assembly is upside-down. The brew chamber having the secured filter with coffee grounds is then filled with water thereby soaking the coffee grounds. Different amounts of water can be added to achieve either a more concentrated or less concentrated extract. If using an embodiment with a centerpiece connector, it is attached by engaging threading at the junction of the brew chamber and the centerpiece connector. The extract chamber is then mounted to an opposite end of the centerpiece connector. A gasket or an O-ring on the threading prevents leakage between the brew/extract chambers and the centerpiece connector. Other embodiments include attaching a centerpiece connector using a snapping mechanism or other leak-proof mechanism of joining the centerpiece connector to the brew/extract chambers. The apparatus is then left to brew, resting securely on the base of the brew chamber. After the proper level of infusion is reached, usually after twelve to twenty-four hours, the brew cycle is complete. The concentration of the coffee extract is time dependent (e.g. a longer brewing time results in a more concentrated extract). The apparatus is then inverted, and the cold brewed coffee extract is filtered through the filter and into the extract chamber. Once the coffee has drained from the brew chamber, the brew chamber and filter are disassembled and the coffee grounds are disposed. Any cold brewed coffee extract that is not immediately used can be decanted from the extract chamber into a storage container. The storage container may be refrigerated for up to two weeks. The filter, the centerpiece connector and brew and extract chambers can then be cleaned for re-use.

Cold brewed coffee is more concentrated and less acidic than conventionally brewed coffee. To approximate the characteristics of a typical cup of coffee, the cold brewed coffee extract can be diluted with hot water. According to preference, it may also be consumed at a higher concentration, used to prepare an iced beverage, or for cooking.

In one preferred embodiment of the invention, the main structural components are composed of acrylic or polycarbonate. In addition, all of the parts of the apparatus are reusable.

These and other features and advantages of this invention are described in, or are apparent from, the following detailed description of various exemplary embodiments of the apparatus and methods according to this invention.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary cold brew beverage brewing systems for producing soluble coffee extract using cold brew infusion and/or provide teachings by which the various exemplary cold brew beverage brewing systems are more readily understood.

FIGS. 10A and 10B are perspective views of the centerpiece connector.

FIG. 15 is a front perspective view of a second exemplary cold brew coffee apparatus including a brew chamber, an extract chamber, and a centerpiece connector therebetween, the chambers being detachable from the centerpiece connector.

FIG. 16 is a front view of the second exemplary cold brew coffee apparatus of FIG. 15.

FIG. 17 is a back view of the second exemplary cold brew coffee apparatus of FIG. 15.

FIG. 18 is a first side view of the second exemplary cold brew coffee apparatus of FIG. 15, the second side view being a mirror image thereof.

FIG. 21 is a front perspective view of a variation of the second exemplary cold brew coffee apparatus including a brew chamber, an alternatively sized extract chamber, and a centerpiece connector therebetween, the chambers being detachable from the centerpiece connector.

FIG. 23 is a front view of the exemplary extract chamber of FIG. 22.

FIG. 24 is a back view of the exemplary extract chamber of FIG. 22.

FIG. 25 is a first side view of the exemplary extract chamber of FIG. 22, the second side being a mirror image thereof.

FIG. 26 is a top view of the exemplary extract chamber of FIG. 22.

FIG. 27 is a bottom view of the exemplary extract chamber of FIG. 22.

FIG. 30 is a simple graphical flow chart showing both top and perspective views of an exemplary extract chamber in an open state and a closed state, where the transition between states is achieved by rotating or twisting the cap.

FIG. 40 is a perspective view of an exemplary handled pod.

FIG. 41 is a front side view of the exemplary handled pod, the back being a mirror image thereof.

FIG. 42 is a first side view of the exemplary handled pod, the second side being a mirror image thereof.

FIG. 43 is a top view of the exemplary handled pod.

FIG. 45 is an enlarged perspective view of an exemplary tabbed pod with the pod lock being shown in both a raised position (in phantom), and being lowered onto the tabbed pod.

FIG. 46 is a perspective view of an exemplary tabbed pod.

FIG. 47 is a front side view of the exemplary tabbed pod, the back being a mirror image thereof.

FIG. 48 is a first side view of the exemplary tabbed pod, the second side being a mirror image thereof.

FIG. 49 is a top view of the exemplary tabbed pod.

Figure 1:
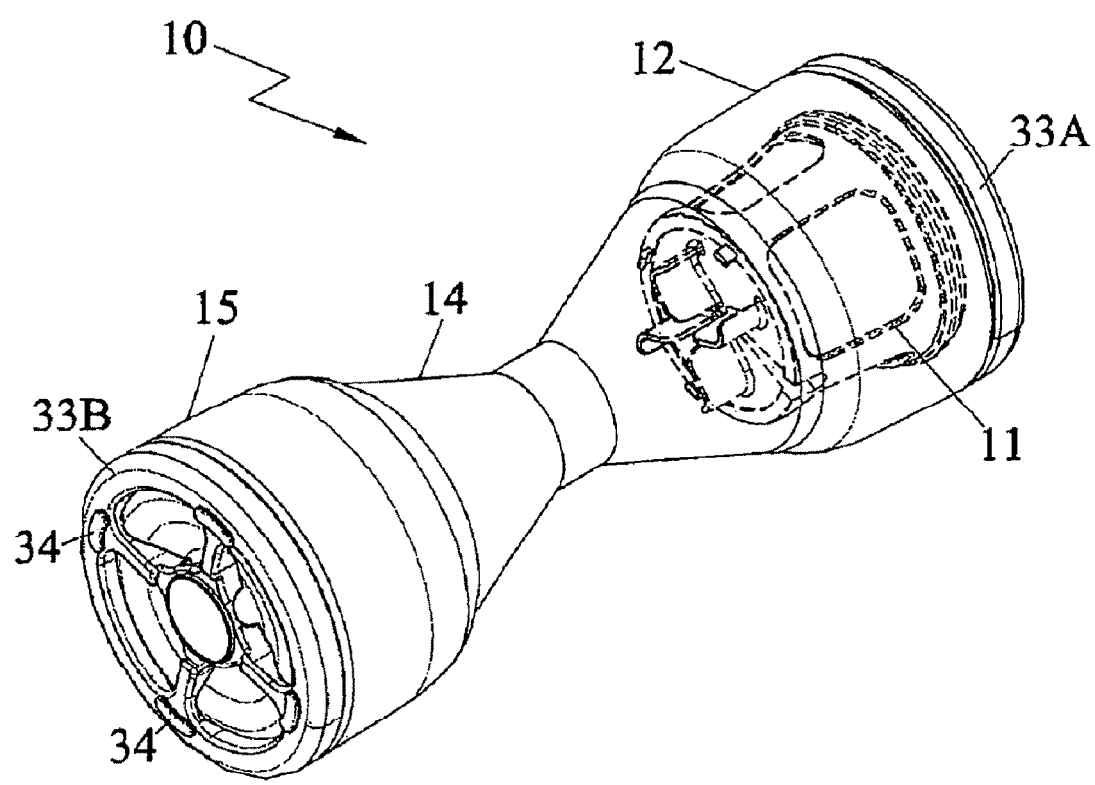
FIG. 1 is a perspective view of a first exemplary cold brew coffee apparatus having a brew chamber and an extract chamber.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein two-container cold brew beverage brewing systems for brewing beverages (e.g. coffee) from beverage material (e.g. coffee grinds) using cold brew infusion to form a soluble coffee extract that may then be diluted to form a drinkable beverage (e.g. using hot water to form hot coffee). The cold brew beverage brewing systems preferably include a brew chamber and an extract chamber. A centerpiece connector is positioned between the two containers (the brew chamber and the extract chamber). The systems also preferably include a filter that is positioned within the brew chamber during brewing. (It should be noted that some of the systems may be single-container systems that may be implemented using a single brew chamber and a filter.) The actual shape of the assembled two-container cold brew beverage brewing systems preferably resembles an hourglass. The cold brew beverage brewing systems may be used for producing soluble coffee extract using cold brew infusion and, therefore, will be primarily referred to as "cold brew coffee apparatuses." Alternative beverages may also be produced. There are two basic systems, although components and features thereof may be interchangeable: FIGS. 1-14 describe the first exemplary cold brew coffee apparatus and FIGS. 15-52 describe the second exemplary cold brew coffee apparatus. Both systems have multiple variations as will be described. Some of the individual components are unique. Also described in relation to the figures are methods and steps for using the systems.

The novel features of the present invention will become apparent from the following description of the preferred embodiment, and as illustrated in FIGS. 1 through 14. Exemplary cold brew beverage brewing systems may be better understood with reference to the drawings, but these cold brew beverage brewing systems are not intended to be of a limiting nature. The same reference numbers will be used throughout the drawings and description in this document to refer to the same or like parts.

First Exemplary Cold Brew Coffee Apparatus

FIG. 1 shows a first exemplary cold brew coffee apparatus (also referred to as an hourglass-shaped cold brew coffee apparatus 10) that includes a filter 11, 41 a brew chamber 12, and a carafe assembly 13. The carafe assembly 13 includes a centerpiece connector 14 (middle unit) and an extract chamber 15. The cold brew coffee apparatus may have other shapes and designs for the centerpiece connector 14, brew chamber 12 and extract chamber 15.

Figure 2:
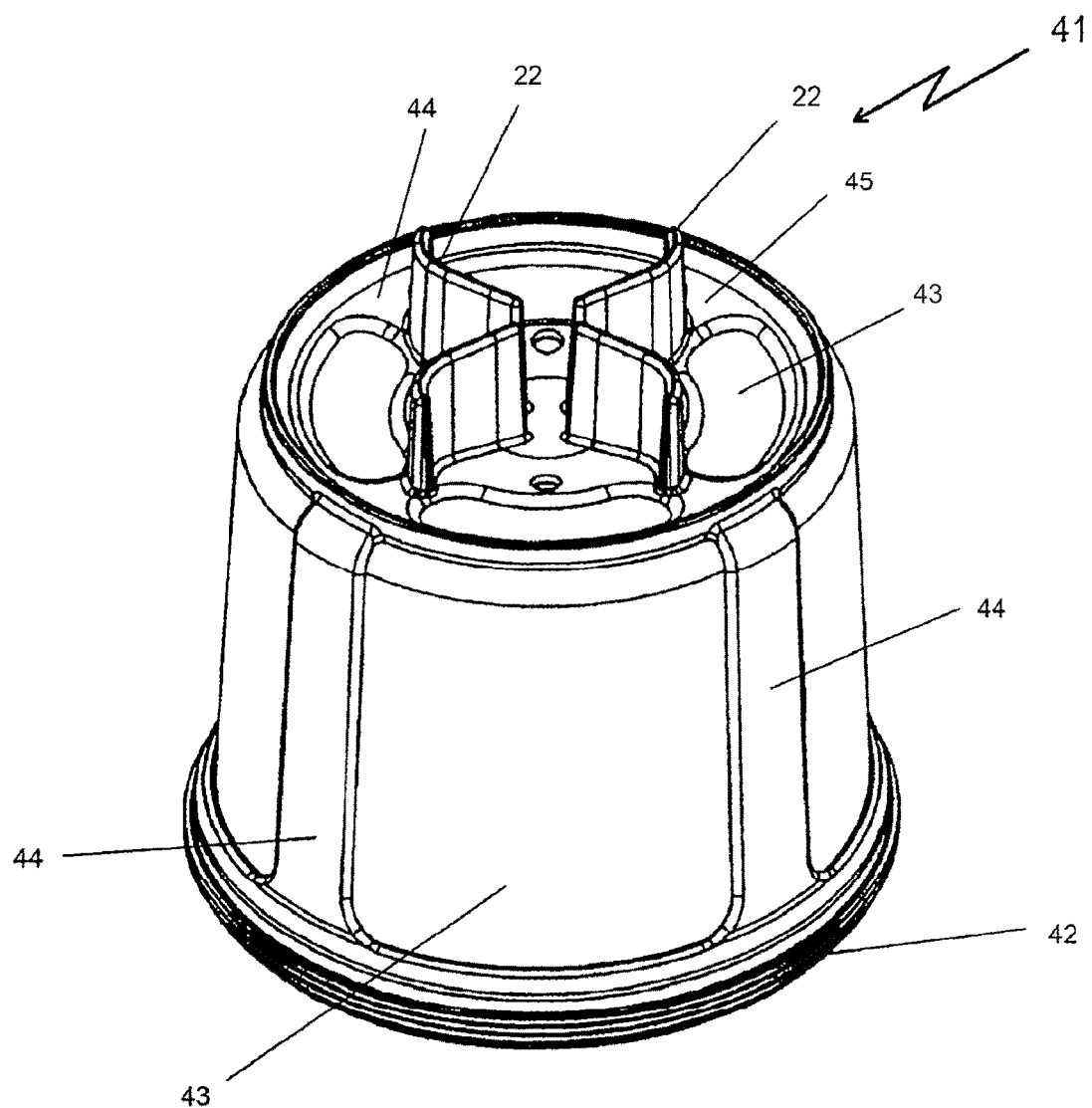
FIG. 2 is a perspective view of a first exemplary filter for use with the first cold brew coffee apparatus, the first exemplary filter having an extruded frame encasing a water-permeable barrier.
Figure 3:
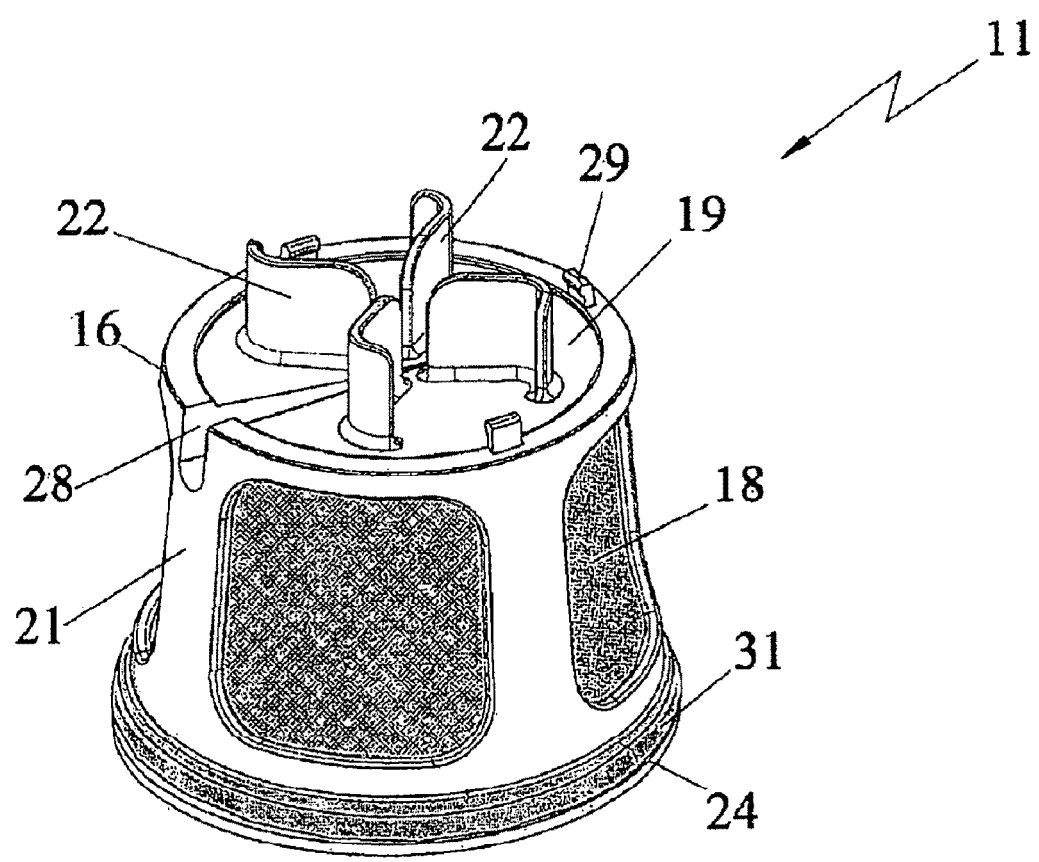
FIG. 3 is a perspective view of a second exemplary filter for use with the first cold brew coffee apparatus, the second exemplary filter being a filter assembly including an outer cup, an inner housing (shown in FIGS. 5A and 5B), and a mesh or water-permeable barrier between the cup and the housing.
Figure 4A:
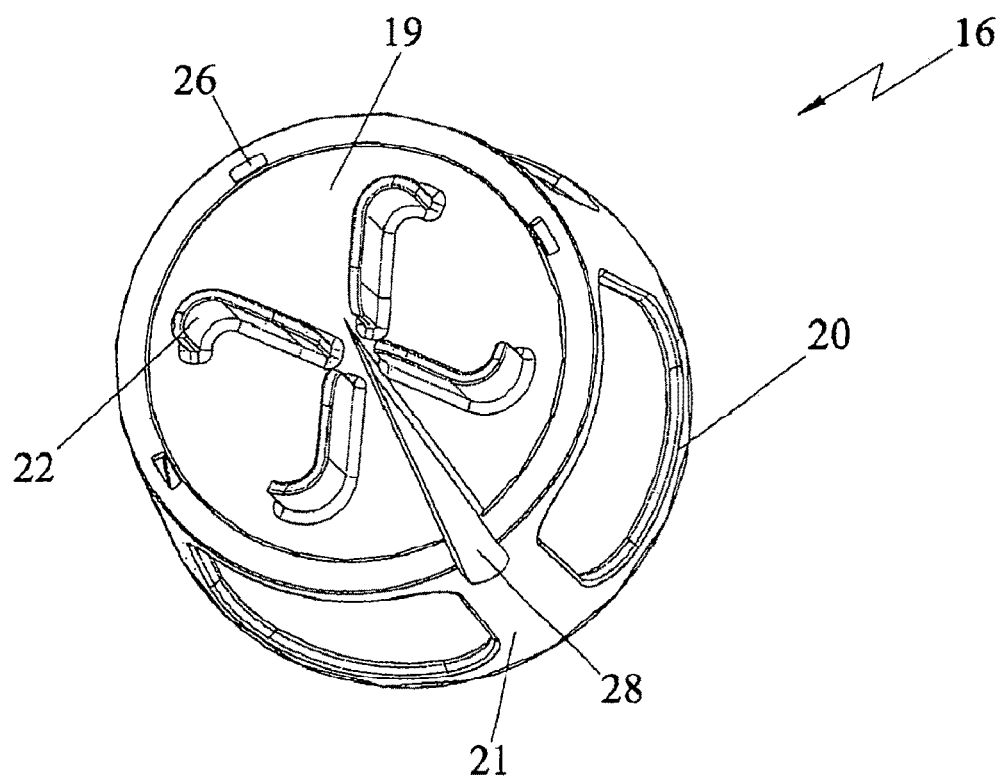
FIGS. 4A, 4B, and 4C are different views of an exemplary outer cup of FIG. 3.
Figure 4B:
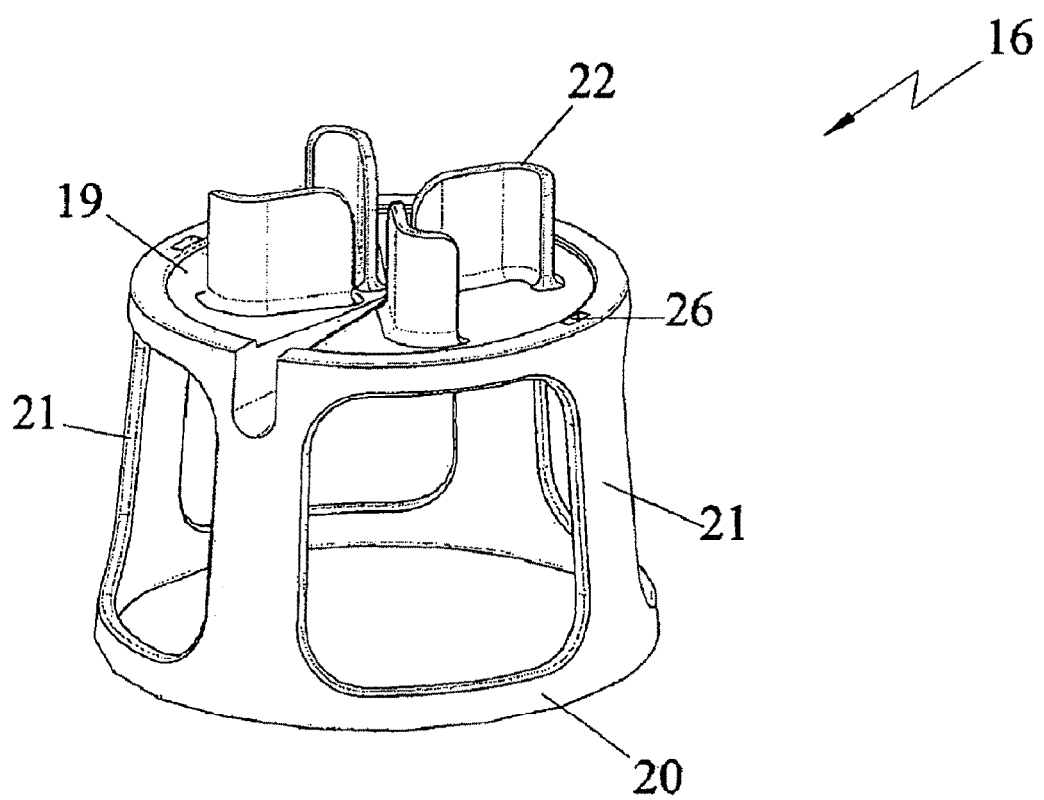
Figure 4C:
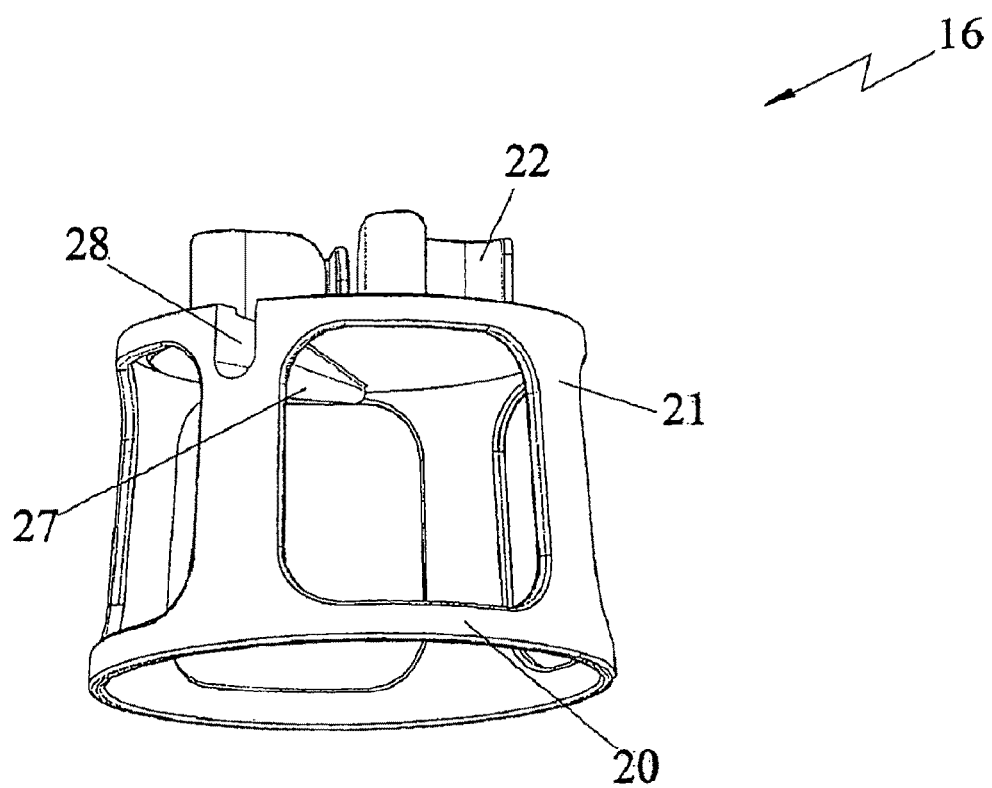
Figure 5A:
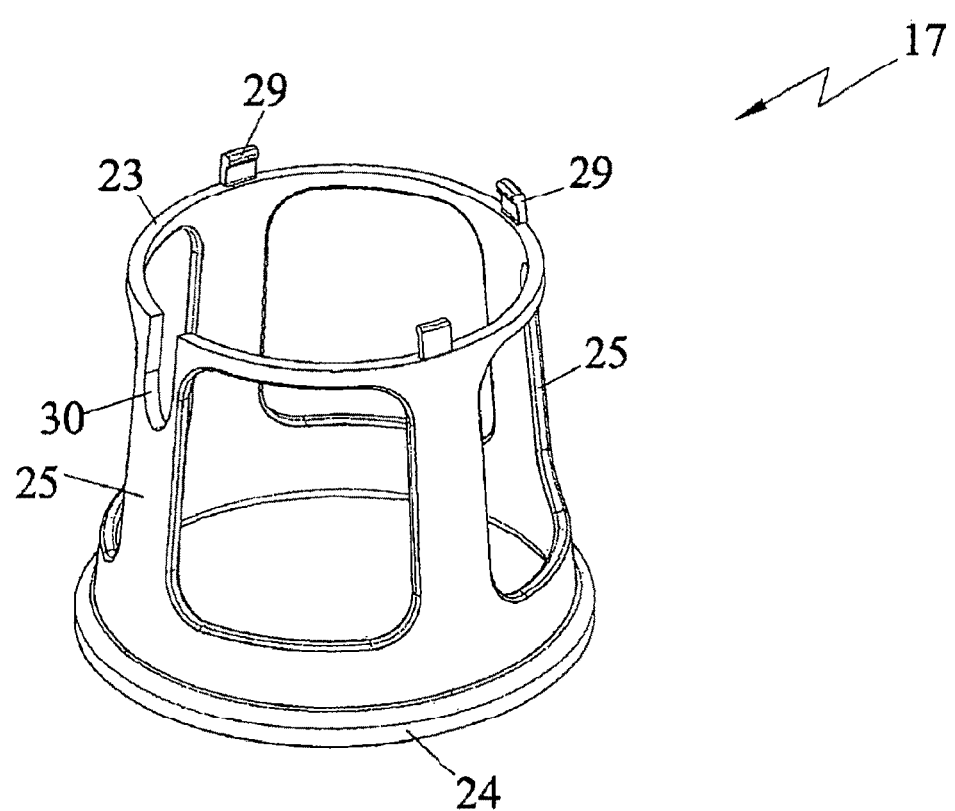
FIGS. 5A and 5B are perspective views of an exemplary inner cup that is used with the outer cup.
Figure 5B:
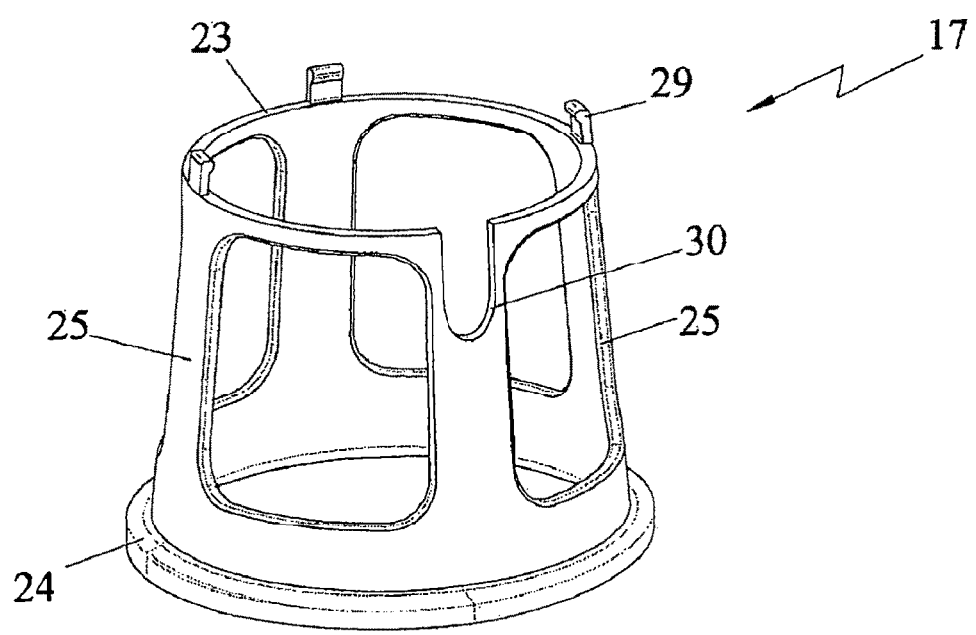
Figure 6:
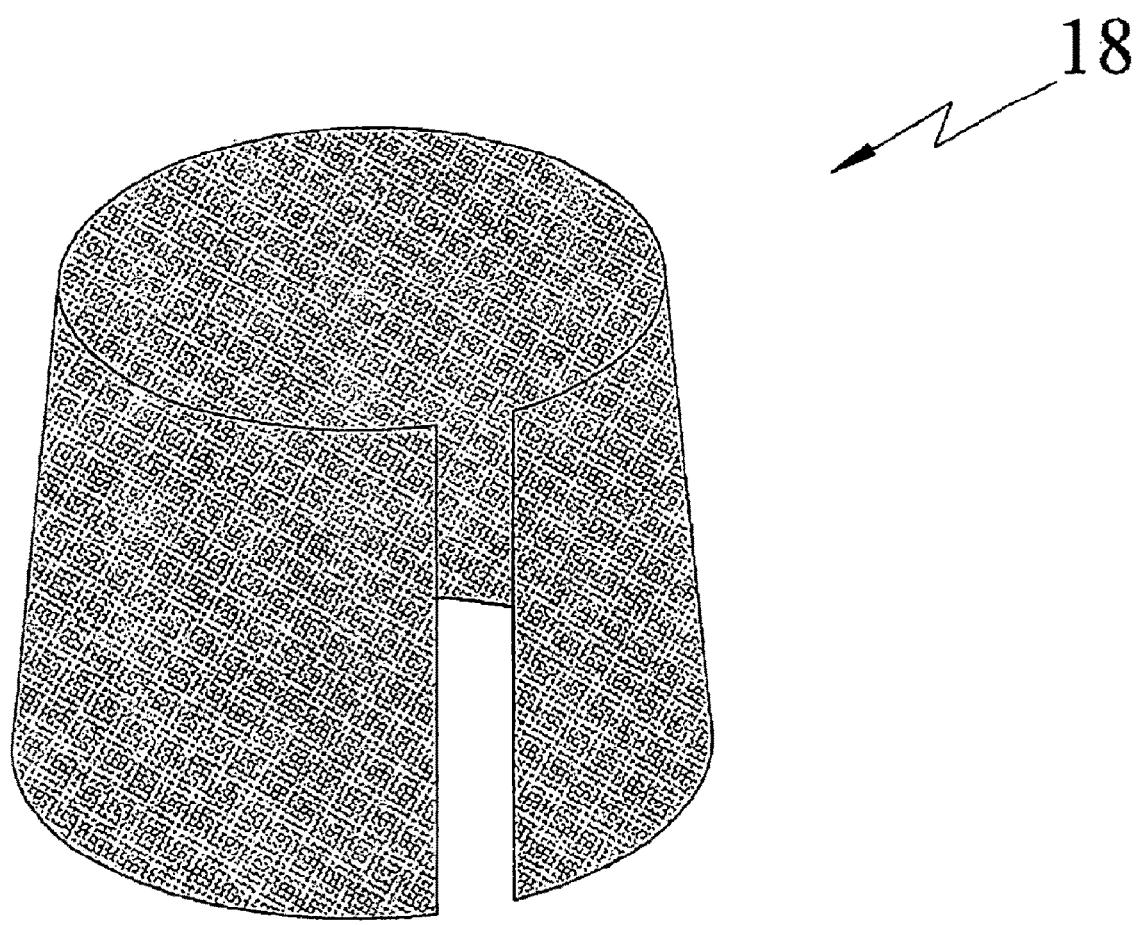
FIG. 6 is a perspective view of an exemplary micro-fine wire mesh or other water-permeable barrier of FIG. 3.

FIG. 2 is a perspective view of a first exemplary filter 41 for use with the first cold brew coffee apparatus, the first exemplary filter 41 having an extruded frame 44 encasing a water-permeable barrier 43. A gasket 42 is attached to the rim of the extruded frame 44. When the extruded frame 44 is placed rim downward, the gasket 42 forms a hermetic seal between the inner volume of the filter 41 and the inner volume of the brew chamber 12. The extruded frame 44 may further include a substantially flat surface having four leg members 22 to form a base opposite the rim. The leg members 22 act as feet to form a base for the filter 41 as ground coffee is placed into the inner volume of the filter 41. The extruded frame 44 may be fabricated from plastic, aluminum, or other non-corrosive material. The water-permeable barrier 43 may be fabricated from a variety of materials including plastic, wire mesh, or laser cut metal.

The interior of the bottom surface of the brew chamber 12 includes a cylindrical depression 32 that is adapted to receive the gasket 42 of the filter 41. The gasket 42 achieves a hermetic seal between the filter and the brew chamber 12 when the filter 41 is inverted, the filter 41 is placed inside the brew chamber 12, and pressure is applied to the flat surface 45 or legs 22 of the filter 41 pushing the rim of the filter 41 into the cylindrical depression in the brew chamber 32.

The filter may also include an assembly of parts. Referring to FIGS. 3-6, the filter assembly 11 includes an outer cup 16, an inner housing 17, and a micro-fine wire mesh or other water-permeable barrier 18 that filters out coffee extract from the coffee grounds. The outer cup's structure includes a substantially flat surface 19 and a rim 20 opposite and connected to the flat surface 19 by a plurality (shown as four) connecting members 21, which leave a plurality (shown as four) of large openings in the outer cup's 16 side walls. The shown four leg members 22 on the flat surface 19 of the outer cup 16 serve as feet to support the filter assembly 11 on any flat surface as the filter assembly is filled with coffee grounds. The inner housing's 17 structure includes a first rim 23 and a second rim 24 connected to the first rim 23 by four connecting members 25, which also leave four large openings in its side walls. The second rim 24 projects outwardly from the exterior of the inner housing 17. The water-permeable barrier 18 is secured between the outer cup 16 and the inner housing 17 so that it is exposed from between their connecting members 21 and 25, thereby enabling the coffee extract to pass through.

The side walls of the outer cup 16 are preferably slightly sloped towards the flat surface 19 and the side walls of the inner housing 17 are slightly sloped towards the first rim 23, so that the inner housing is telescopically received in the outer cup. In addition, the external dimensions of the inner housing 17 are substantially equal to the internal dimensions of the outer cup 16, leaving a small clearance between them to firmly accommodate the water-permeable barrier 18. The outer cup 16 includes three holes 26 around the periphery of its flat surface 19 and a projecting section 27, which radially projects downwards from the flat surface 19. The projecting section 27 extends into one of the connecting members and forms a groove 28 on top of the flat surface 19. The groove 28 channels water into the brew chamber to soak the grounds. The interior of the flat surface 19 includes a radially oriented groove (not shown) for receiving the first rim 23 of the inner housing 17. The first rim 23 includes three projecting members 29 and a groove 30 on one of the connecting members. The projecting members 29 are suitably designed to snap into the holes 26 of the outer cup 16.

In order to secure the inner housing 17 inside the outer cup 16, the projecting section 27 is received in the groove 30 of the inner housing and the projecting members 29 are snapped into the holes 26 of the outer cup, by pushing the inner housing inside the outer cup. But, first the water-permeable barrier 18 is wrapped around the inner housing 17 before it is secured inside the outer cup 16. A gasket 31 or an O-ring is placed between the rim 20 of the outer cup and the second rim 24 of the inner housing. The interior of the bottom surface of the brew chamber 12 includes a cylindrical depression 32 that is adapted to receive the second rim 24 of the inner housing 17. The gasket 31 placed between the rim 20 of the outer cup and the second rim 24 of the inner housing helps in achieving a secure fit between the filter 11 and the brew chamber 12.

Figure 7A:
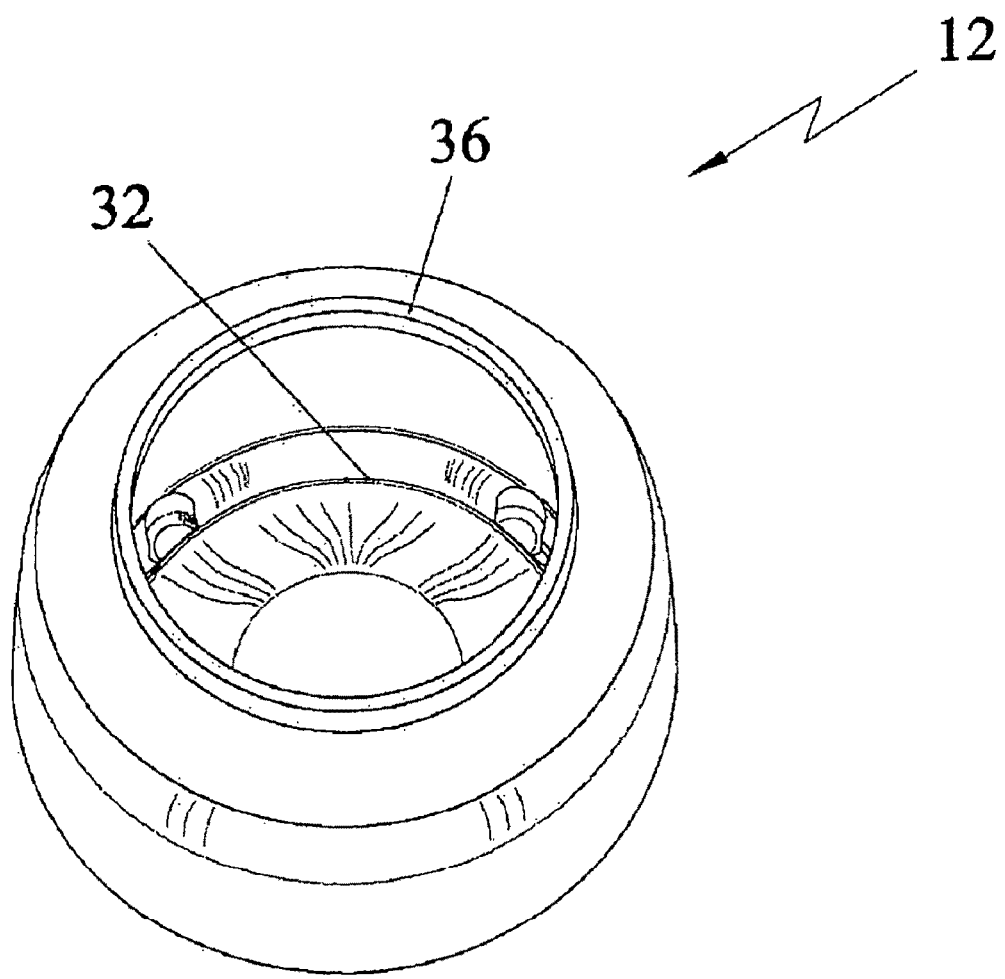
FIGS. 7A and 7B are perspective views of an exemplary brew chamber and/or extract chamber.
Figure 7B:
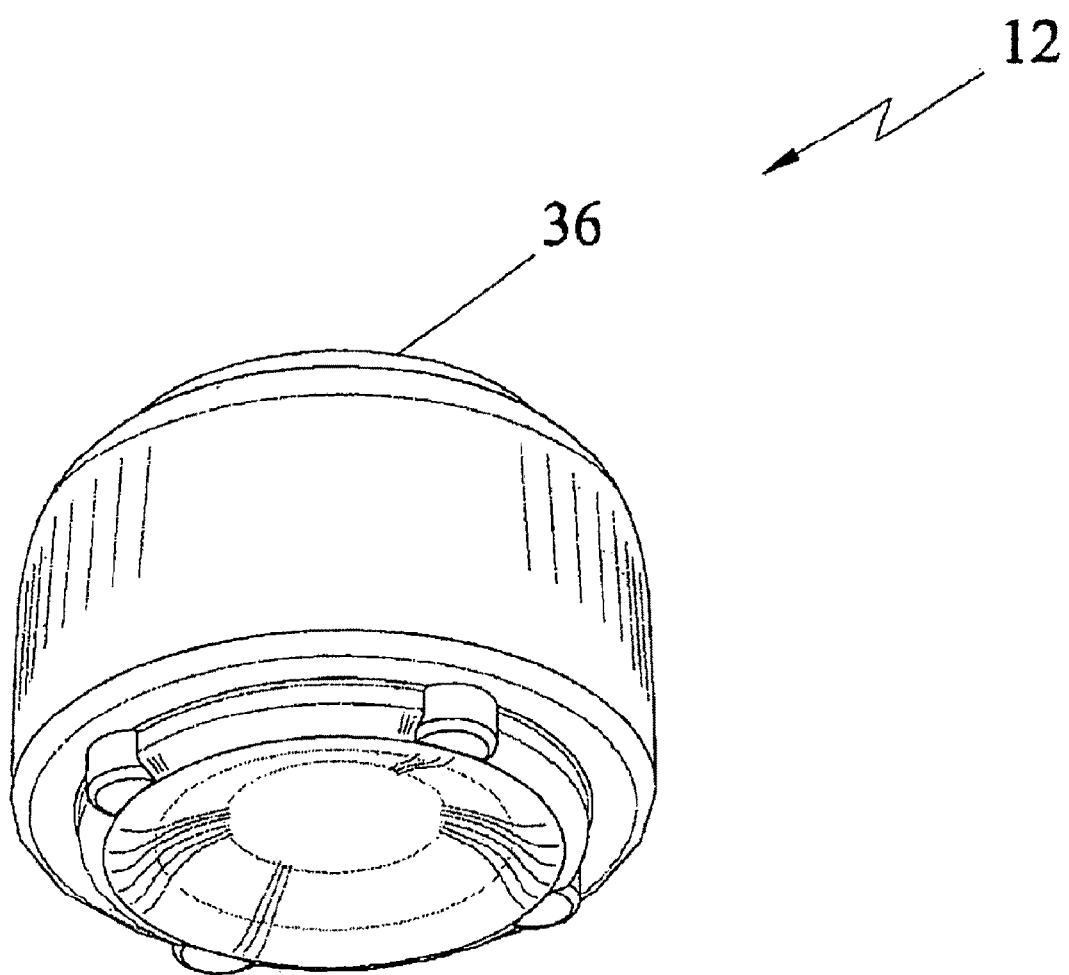
Figure 8:
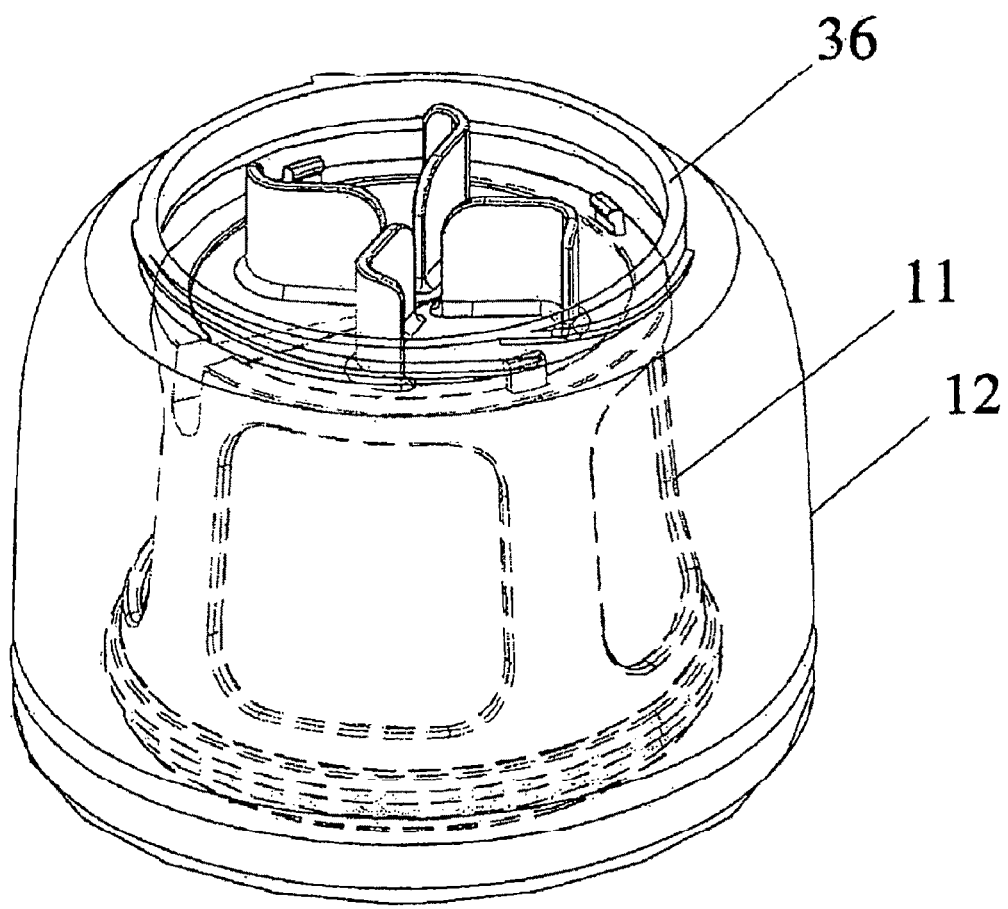
FIG. 8 is a perspective view of the brew chamber with the filter positioned therein.

Referring to FIGS. 7 and 8, the brew chamber 12 and extract chamber 15 are preferably identical and constitute approximately one fourth the size of the whole apparatus 10, representing the ends of the centerpiece connector 14. The interior of the bottom surface of the brew and extract chambers 12 and 15 includes a cylindrical depression 32 to receive the gasket 31, 42 of the filter and forms a hermetic seal.

Figure 9A:
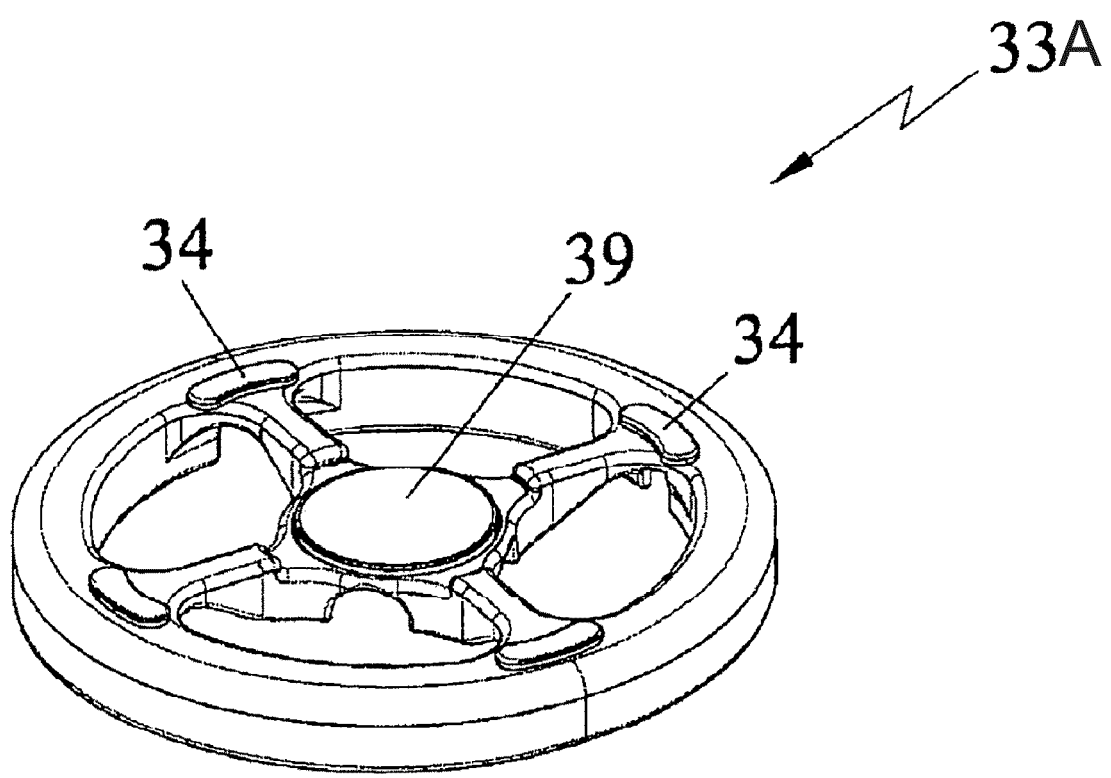
FIGS. 9A and 9B are perspective views of the bases with gripping pads.
Figure 9B:
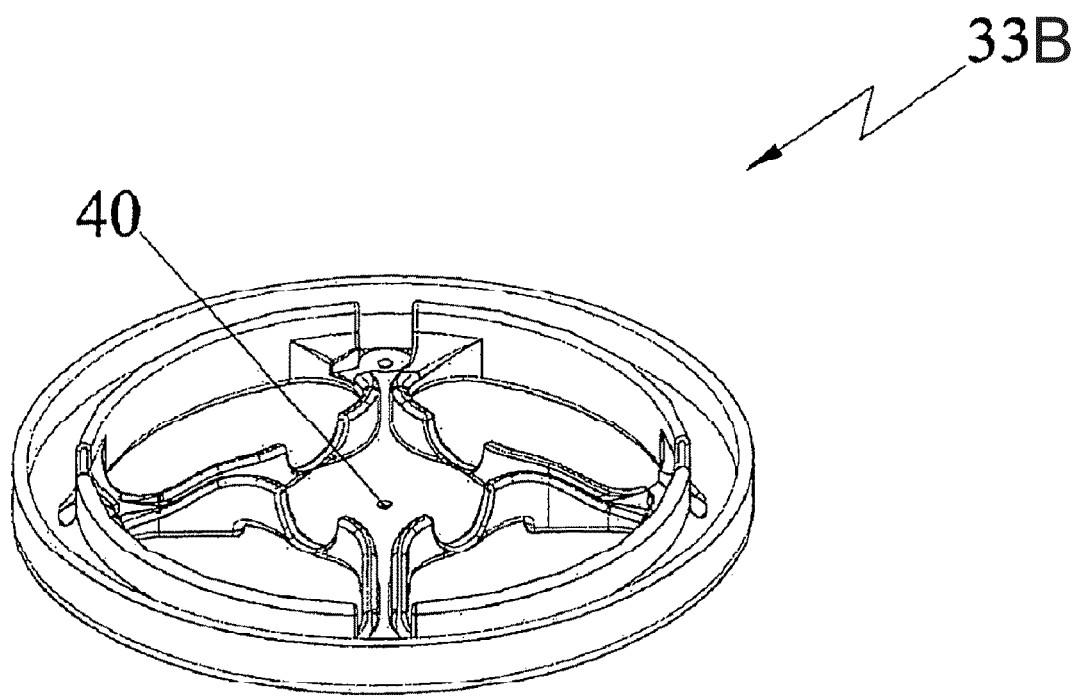

Referring to FIGS. 9A and 9B, a first base 33A is attached to the brew chamber 12. The cylindrical depression 32 in the interior of the brew chamber leads to a cylindrical projection on its exterior bottom surface. The first base 33A is adapted to be firmly attached over the cylindrical projection. A second base 33B, similar to the first base 33A, is attached to the bottom of the extract chamber 15. Several designs and structures are possible for the bases, one of them being shown in FIGS. 9A and 9B. The bases further include a plurality of gripping pads 34 made of rubber or other anti-slip materials. The center portion of the bases may include a removable disc 39, which can be snapped into the indentation in the base 40. Even the gripping pads can be snapped onto the bases. The removable disc 39 may be marked with a trademark, logo, or other design.

Figure 10A:
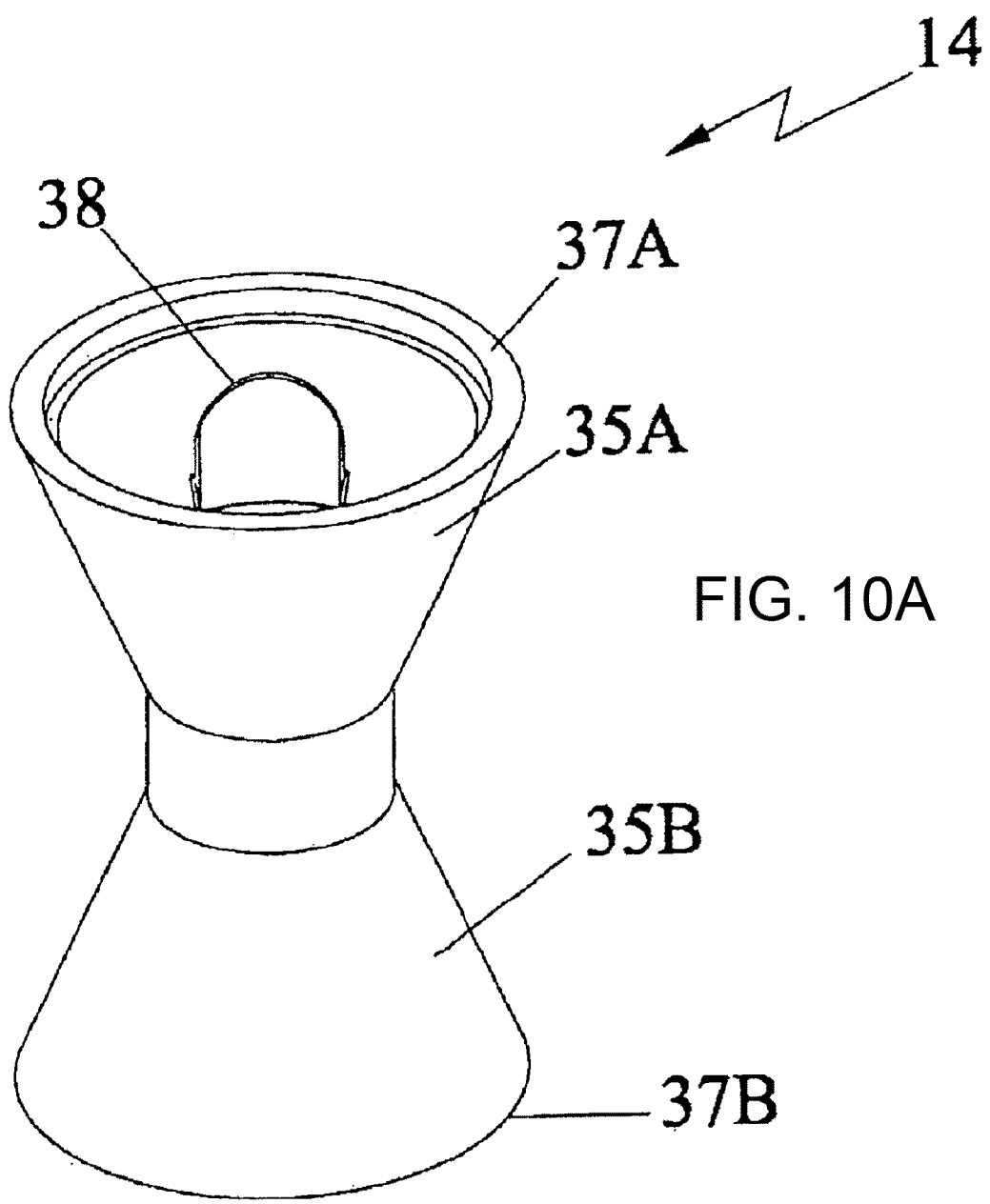
Figure 11:
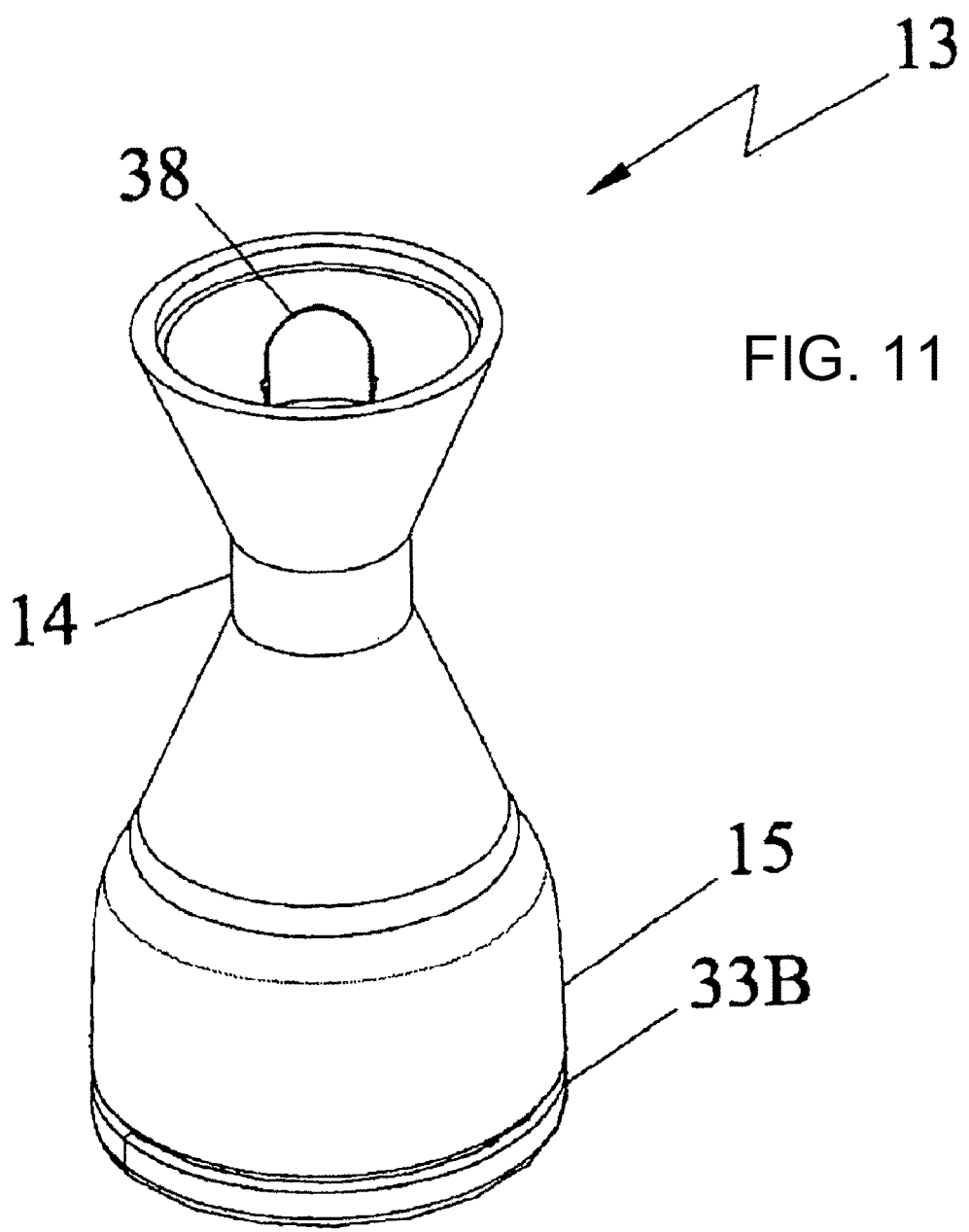
FIG. 11 is a perspective view of the carafe assembly.

Referring to FIGS. 10A and 10B, the centerpiece connector 14 is hollow to allow the passage of liquid. One example of the centerpiece connector includes two conical members 35A and 35B connected at their vertices. The centerpiece connector 14 is approximately half the size of the apparatus 10. The inner surface of the conical members includes pouring structures 38. The brew and extract chambers include helical threaded indentation on the exterior of their mouths 36, which are adapted to engage a complimentary set of threaded indentation on the inner surfaces of the two ends 37A and 37B of the centerpiece connector 14. A gasket is used to form a hermetic seal at the junction of the centerpiece connector 14 and the brew/extract chambers. The centerpiece connector 14, along with the brew and extract chambers 12 and 15 mounted to its either ends, is designed to conform to an hourglass shape. Other shapes that allow the passage of liquid between the brew and extract chambers are also contemplated.

Figure 12:
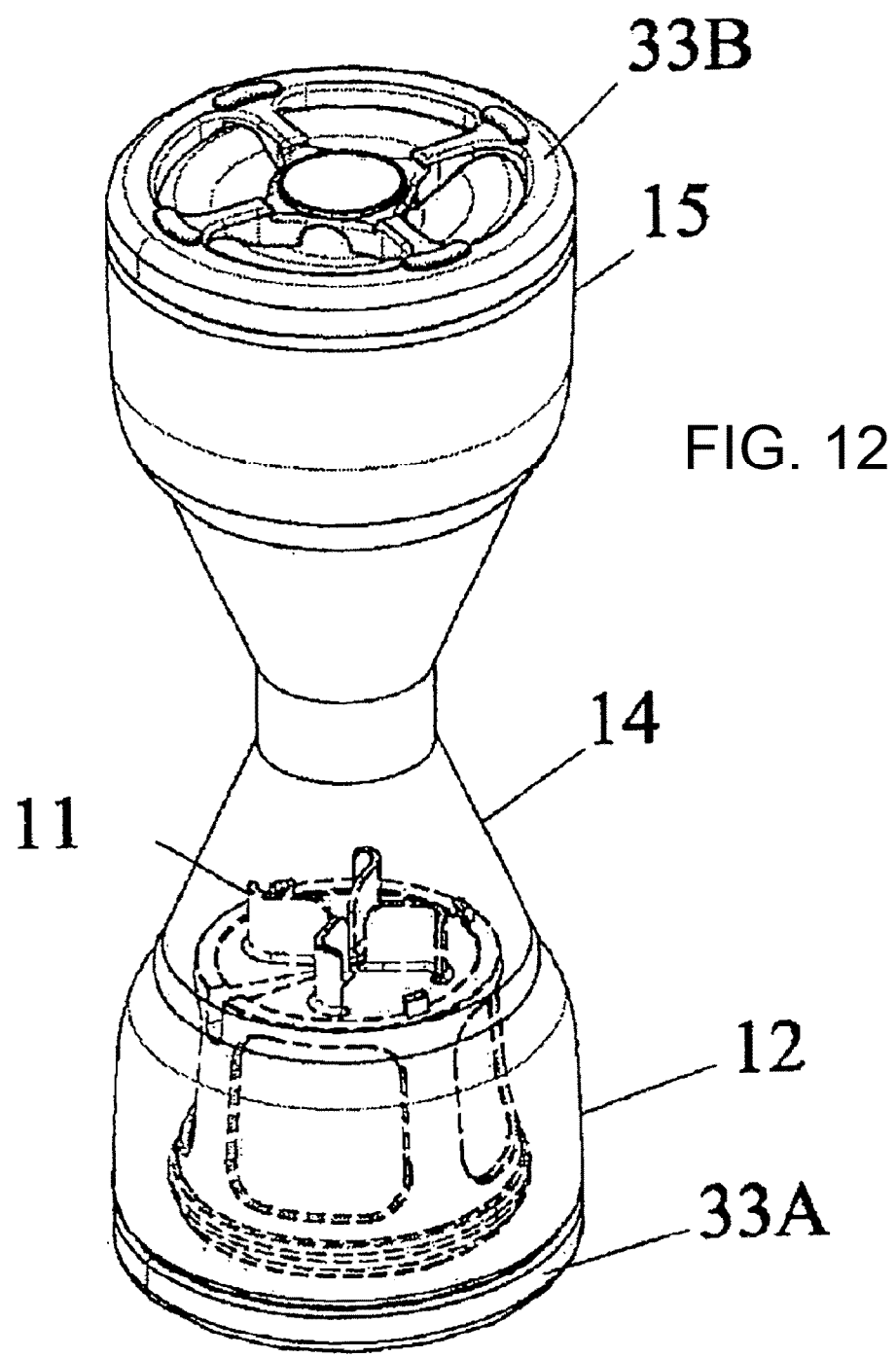
FIG. 12 is a front view of the cold brew coffee apparatus of the present invention, fully assembled and standing on the brew chamber.
Figure 14:
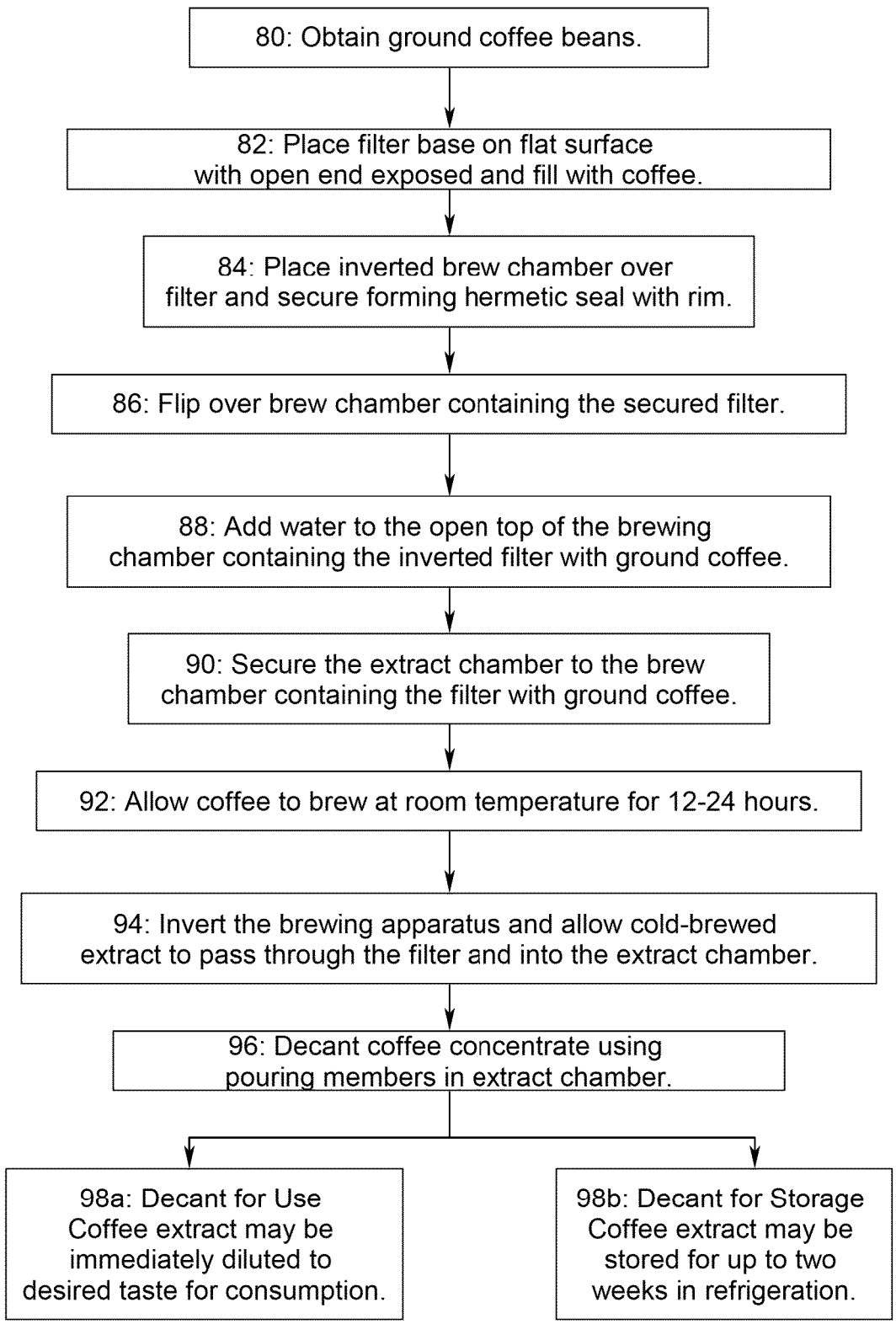
FIG. 14 is a flow chart explaining how to use the apparatus.

Referring to FIG. 14, in order to use the apparatus, first, obtain ground coffee beans either by purchasing pre-ground beans or grinding whole beans 80. Detach the brew chamber 12 from the centerpiece connector 14 and the filter 11, 41 is removed and set aside. The extract chamber 15 is still mounted to the opposite end of the centerpiece connector 37B. Approximately two cups of fresh coffee grounds are then placed in the filter which is stabilized and supported by the leg members 22 with the open end up exposing the inner volume 82. The brew chamber 12 with its associated base 33A is inverted 84 so that its open end is fitted over the filter 11, 41, in a downward motion sealing in place the gasket 31, 42 using pressure to engage the gasket with the cylindrical depression in the brew chamber. The inner volume of the filter 11, 41 thereby encloses the coffee grounds and forms a hermetic seal between the gasket 31, 42 and the brew chamber 84. The brew chamber 12, now engaged with the filter 11, 41, is then inverted again so the first base 33A is down and the leg members 22 of the filter 11, 41 are facing up 86 exposing the open top of the brew chamber. Add cold water (room temperature or colder) or other brewing liquid to the open top of the brew chamber containing the filter with ground coffee 88. Add sufficient liquid to cover the grounds without overflowing 88. One of the ends 37A of the centerpiece connector is mounted to the brew chamber 90 secured to an inverted filter with coffee. The apparatus 10 now stands on the brew chamber 12, particularly on the first base 33A attached to the brew chamber 12, as seen in FIG. 12. The gaskets between each base and the centerpiece connector prevent leakage after the apparatus is assembled. Water soaks into the grounds and starts the cold brew infusion process. The brewing process takes approximately twelve to twenty-four hours at room temperature although brewing may occur at lower temperatures not to exceed freezing 92.

Figure 13:
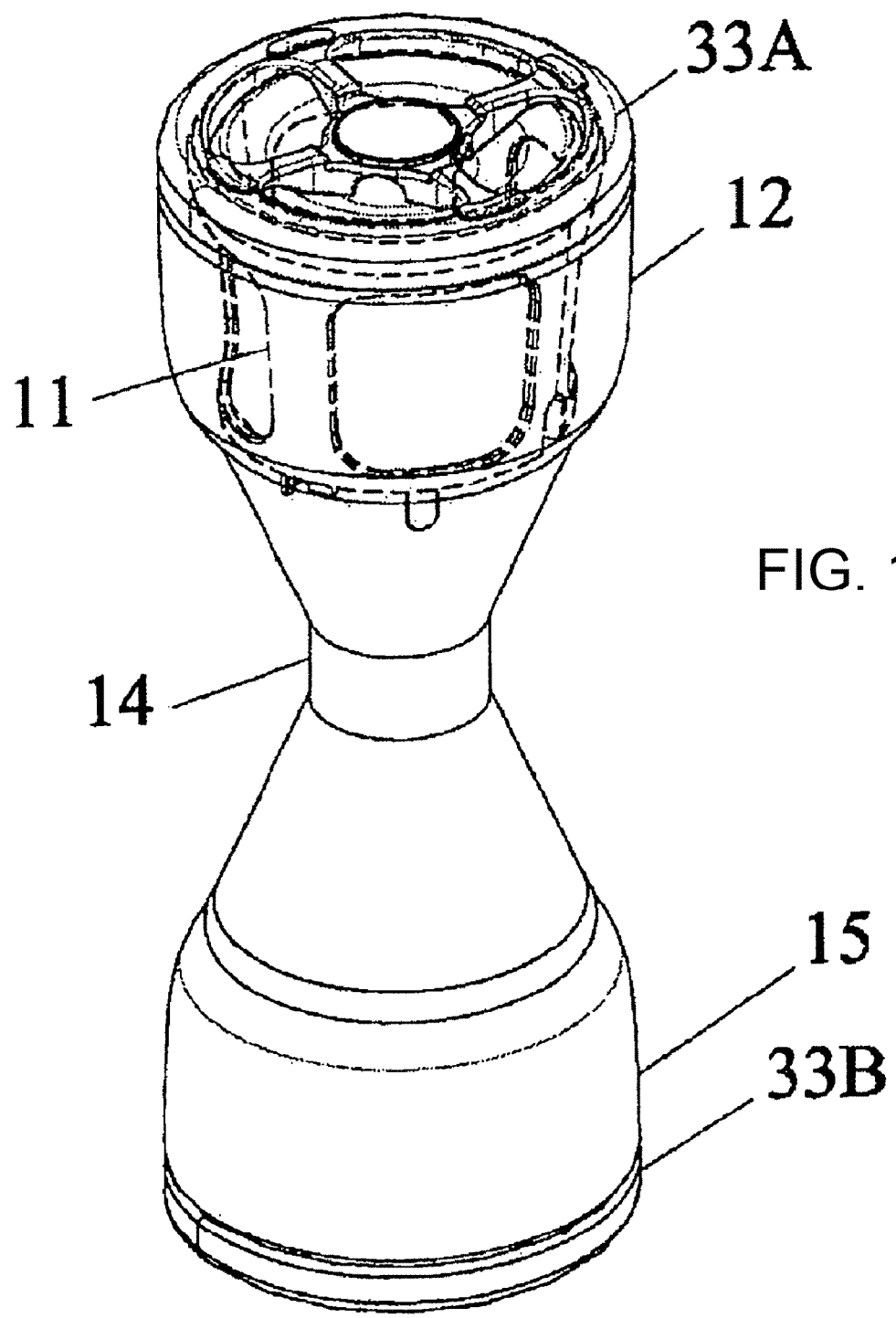
FIG. 13 is a front view of the cold brew coffee apparatus of the present invention, fully assembled and standing on the extract chamber to collect the coffee.

After the brew cycle is complete, invert the brewing apparatus 10 to stand on the extract chamber 15, allowing the soluble coffee extract to pass through the filter and centerpiece connector and accumulate in the extract chamber 94, as seen in FIG. 13. The cold brewed coffee extract then drains out of the filter 41 and the brew chamber 12, and into the extract chamber 15 through the centerpiece connector 14, 94. The apparatus 10 takes approximately five minutes to complete this step. After all the extract has drained into the extract chamber 15, the brew chamber 12 and filter 11, 41 are disconnected and the coffee grounds are disposed of. The coffee extract is then decanted from the extract chamber 15 using the pouring structures 38 located on the inner surface of the centerpiece connector 96. The coffee extract can be poured into a storage container and can be kept fresh under refrigeration for up to two weeks 98*b*. Once the coffee has been dispensed, the entire apparatus can be disassembled and cleaned.

Coffee brewed in the apparatus 10 is a deep rich extract coffee concentrate, and is far less acidic than conventionally brewed coffee. It can be diluted with hot water to a desired taste and strength 98*a*. To make a typical cup of coffee, two to three ounces of extract are added to 8 oz of hot water. More or less concentrate can be added for desired taste and strength. In one preferred embodiment of the invention, the brew chamber, the extract chamber, and the centerpiece connector of the apparatus are made of acrylic or polycarbonate material. Other materials may be used, however, including glass, metal and other forms of plastic.

Second Exemplary Cold Brew Coffee Apparatus

FIGS. 15-52 describe the second exemplary cold brew coffee apparatus 100 (and variations thereof) that, like the first exemplary cold brew coffee apparatus of FIGS. 1-14, includes a brew chamber 120 and an extract chamber 150, a centerpiece connector 140 being positioned therebetween. As will be discussed, there are different types of filters that can be used with the second exemplary cold brew coffee apparatus 100. The three filters shown and discussed are a direct-grind filter 170 (FIG. 38), a handled-pod filter 180 (FIGS. 40-43), and a tabbed-pod filter 190 (FIGS. 45-49). Some of the features discussed in relation to the first exemplary cold brew coffee apparatus of FIGS. 1-14 are also applicable to the second exemplary cold brew coffee apparatus 100 (and variations thereof) and, to avoid redundancy, will not be repeated although they are incorporated in the description of the second exemplary cold brew coffee apparatus 100 (and variations thereof).

FIG. 15-21 show various views of the second exemplary cold brew coffee apparatus 100 including a brew chamber 120 and an extract chamber 150. A detachable centerpiece connector 140 is positioned between the brew chamber 120 and an extract chamber 150.

Figure 20:
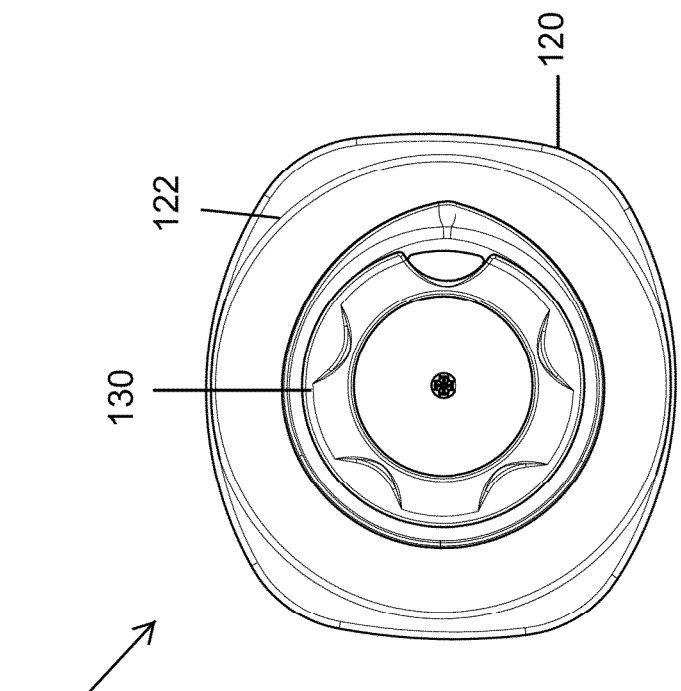
FIG. 20 is a bottom view of the second exemplary cold brew coffee apparatus of FIG. 15.
Figure 19:
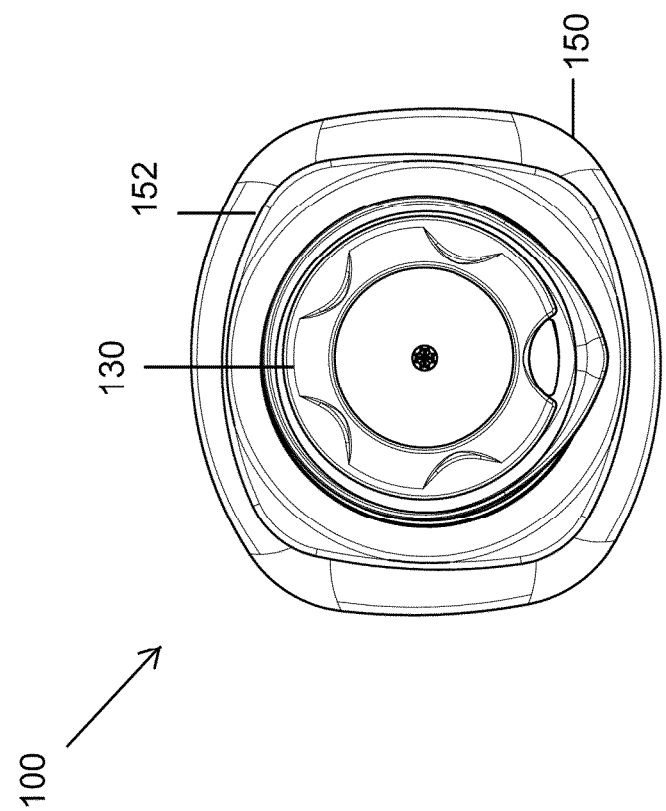
FIG. 19 is a top view of the second exemplary cold brew coffee apparatus of FIG. 15, an exemplary cap being included thereon.
Figure 22:
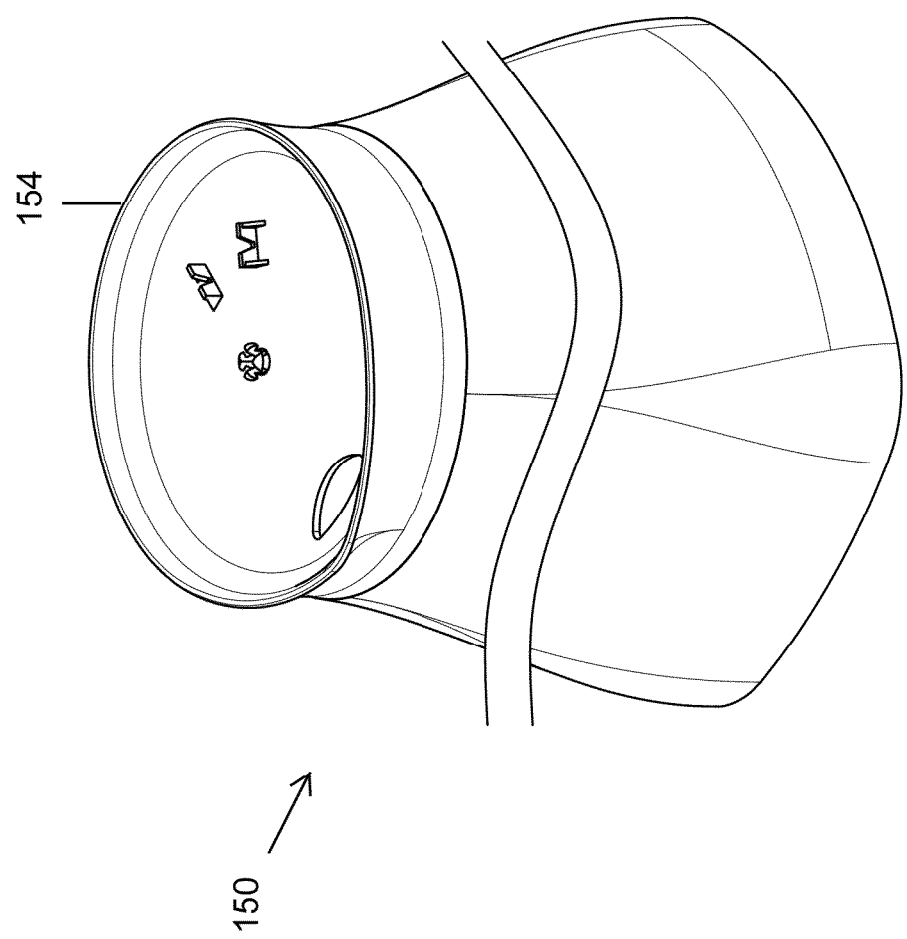
FIG. 22 is a front perspective view of an exemplary extract chamber and a cap therefor.

FIG. 19 shows the bottom base 152 of the extract chamber 150. FIG. 20 shows the bottom base 122 of the brew chamber 120. The bottom bases 122, 152 each have an associated cap 130. It should be noted that the bottom base may be integral or have an associated base (in a manner similar to FIGS. 9A and 9B). An integral bottom base of the extract chamber 150 may be molded (or otherwise constructed) to securely accommodate the cap 130. A non-integral bottom base of the extract chamber 150 may be a distinct molded (or otherwise constructed) bottom base that is associated (e.g. attached directly or indirectly using known attachment means such as adhesives and/or mechanical structure) with the physical bottom structure of the respective chamber 120, 150.

The caps 130 for the chambers 120, 150 are shown as being identical for interconnectability, but alternatives could have distinct caps 130 for each chamber 120, 150. Although there are some advantages to the shown shape, the shape is meant to be exemplary and not to limit the scope of the invention. The cap may be molded (or otherwise constructed) from materials such as rubber, plastic, and other known and yet to be discovered materials suitable for the purposes described herein (e.g. attaching and sealing). The actual attachment of a cap 130 to a bottom base 122, 152 may be accomplished using any known attachment scheme including, but not limited to, a friction attachment (e.g. gripping or nesting), snap fit, rotational, or any attachment scheme known or yet to be discovered.

FIG. 21 is a front perspective view of a variation of the second exemplary cold brew coffee apparatus 100" including a brew chamber 120, an alternatively sized extract chamber 150", and a centerpiece connector 140 therebetween, the chambers being detachable from the centerpiece connector 140. In fact, the shapes and sizes of both chambers 120, 150 may be adjusted for their intended purpose. FIGS. 22-27, however, show that the extract chamber 150 (or, not shown, the extract chamber 150') could be any height. FIG. 26 also shows an alternative cap 130'.

A cap 130 may be positioned on the bottom base of the chambers 120, for example, during brewing or when the brew chamber 120 is attached to the extract chamber 150. Alternatively, the cap 130 may be positioned on the bottom of the chambers 120, 150 for storage or when otherwise not in use. The bottom of the chambers 120, 150 may be molded (or otherwise constructed) to securely accommodate the cap 130. As mentioned, the actual attachment may be any known attachment scheme including, but not limited to, a friction attachment (e.g. gripping or nesting), snap fit, rotational, or any known attachment scheme known or yet to be discovered.

Figure 28:
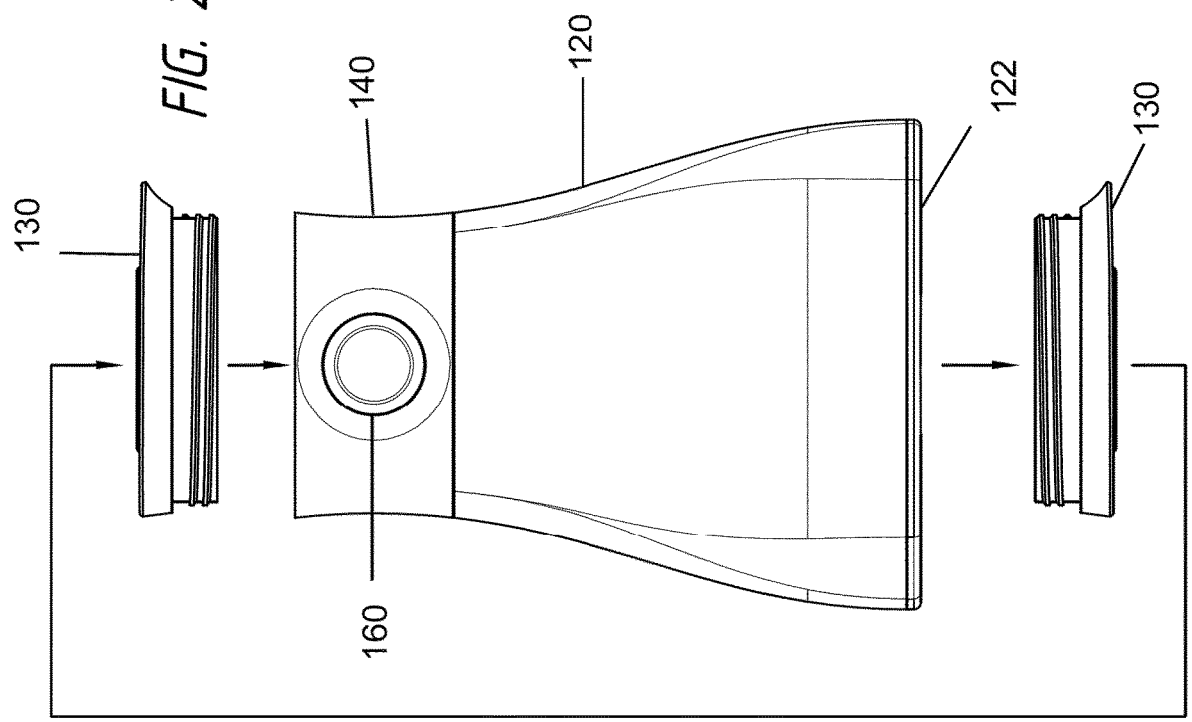
FIG. 28 is a front view of an exemplary brew chamber and centerpiece showing the alternative positions for a cap in relationship thereto.

FIG. 28 shows that the cap 130 may be removed from the bottom base 122 and positioned on the rim of the centerpiece connector 140. (And the cap 130 may be removed from the rim of the centerpiece connector 140 and positioned on the bottom base 122.) Alternatively, and not shown, the cap 130 may be removed from the bottom base 122 and positioned on the rim of the brew chamber 120. (And the cap 130 may be removed from the rim of the brew chamber 120 and positioned on the bottom base 122.) The cap 130 may be completely separated from the brew chamber 120 for cleaning.

Figure 29:
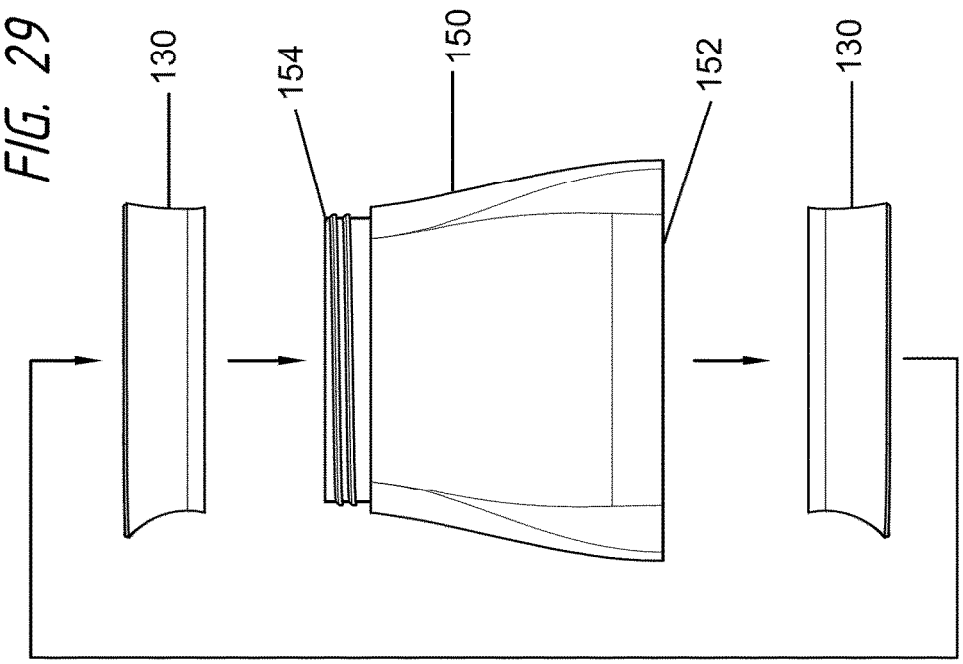
FIG. 29 is a front view of an exemplary extract chamber showing the alternative positions for a cap in relationship thereto.

FIG. 29 shows that the cap 130 may be removed from the bottom base 152 and positioned on the rim of the extract chamber 150. (And the cap 130 may be removed from the rim of the extract chamber 150 and positioned on the bottom base 152.) Alternatively, and not shown, the cap 130 may be removed from the bottom base 152 and positioned on the rim of the extract chamber 150. (And the cap 130 may be removed from the rim of the extract chamber 150 and positioned on the bottom base 122.) The cap 130 may be completely separated from the extract chamber 150 for cleaning.

FIG. 30 is a simple graphical flow chart showing both top and perspective views of an exemplary extract chamber 150 in an open state and a closed state, where the transition between states is achieved by rotating or twisting the cap 130.

Figure 31:
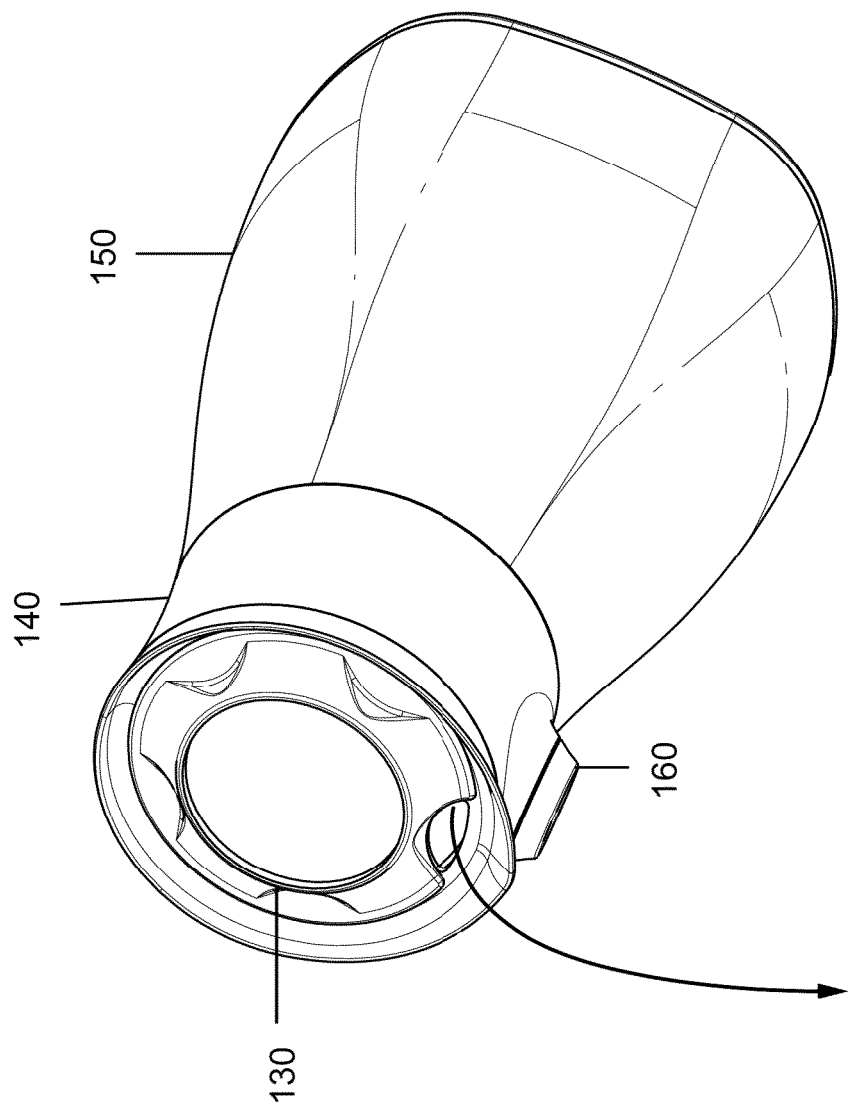
FIG. 31 is a perspective view of the extract chamber shown with cap in open position to allow fluids to flow out from the extract chamber.

On the right side of FIG. 30 is a pairing of a top view and a perspective view of the exemplary extract chamber 150 in an open state. As shown in FIG. 31, in the open state, fluid is able to flow out from the extract chamber 150. The open state would be particularly useful for pouring. By twisting the cap 130, the exemplary extract chamber 150 transitions from the open state to a closed state (the left side of FIG. 30). The closed state would be particularly useful for storage. Although the transition is shown as being accomplished via twisting, the actual transition may be any known transition scheme including, but not limited to, a spring-loaded transition, a lifting-lowering transition (such as a sports drink cap 130), a physical removal and replacement transition, or any transition scheme known or yet to be discovered.

Figure 33:
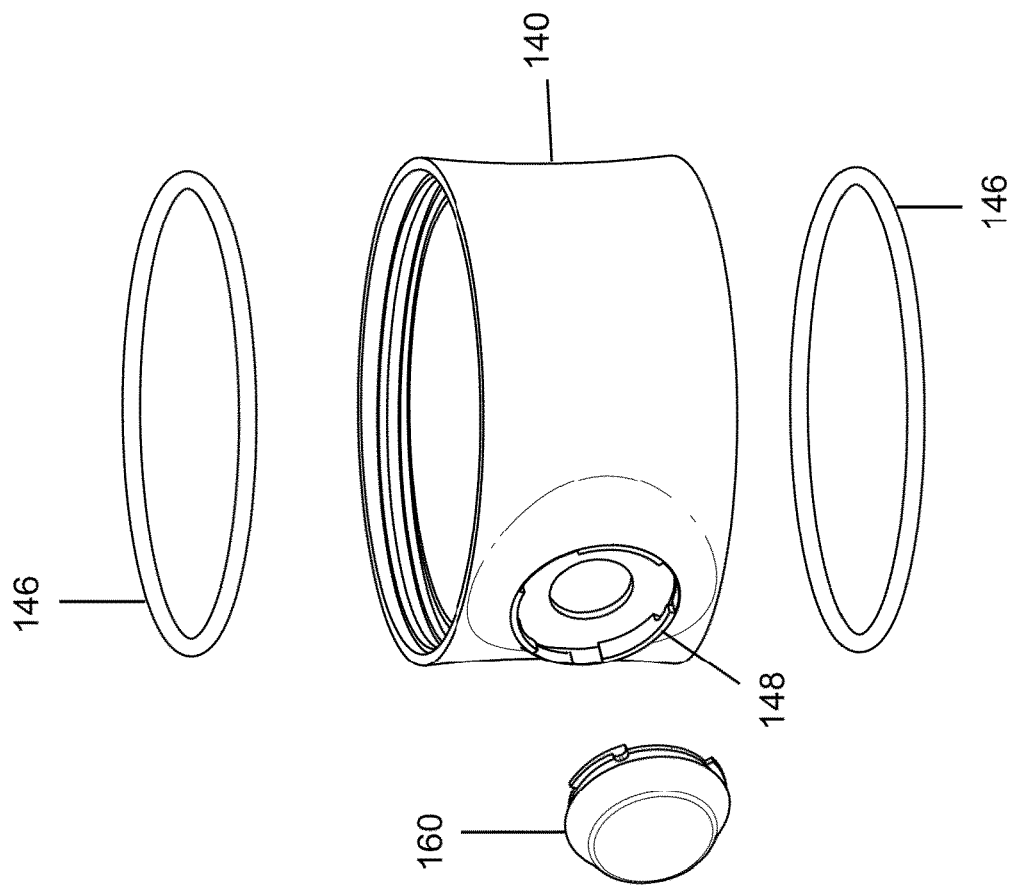
FIG. 33 is an expanded view of the centerpiece connector.
Figure 32:
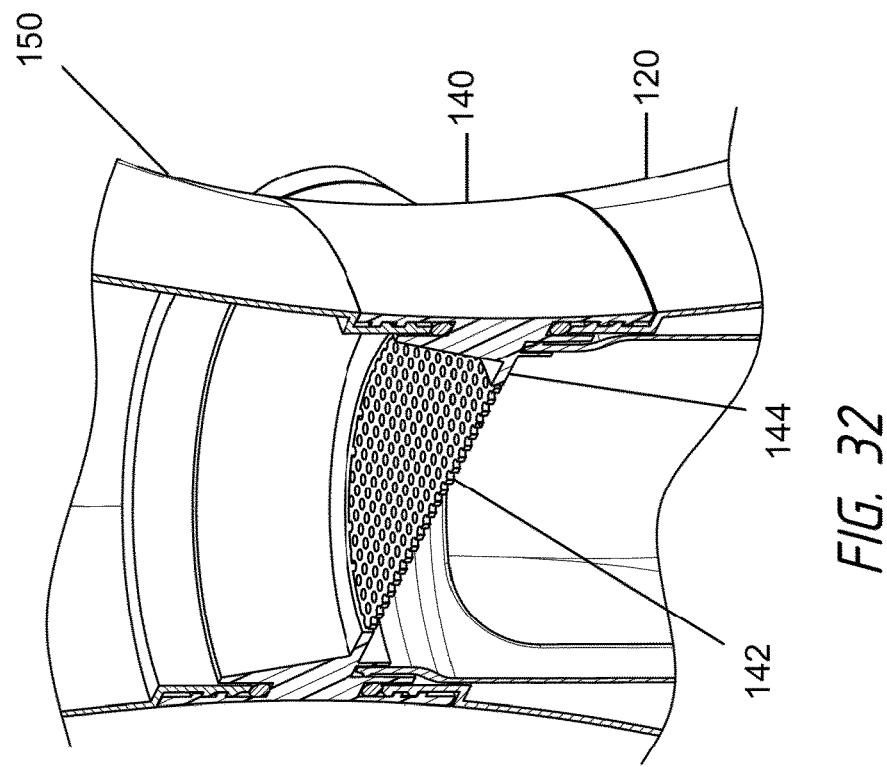
FIG. 32 is a cross-sectional perspective view of the centerpiece connector, showing a screen filter therein.
Figure 35:
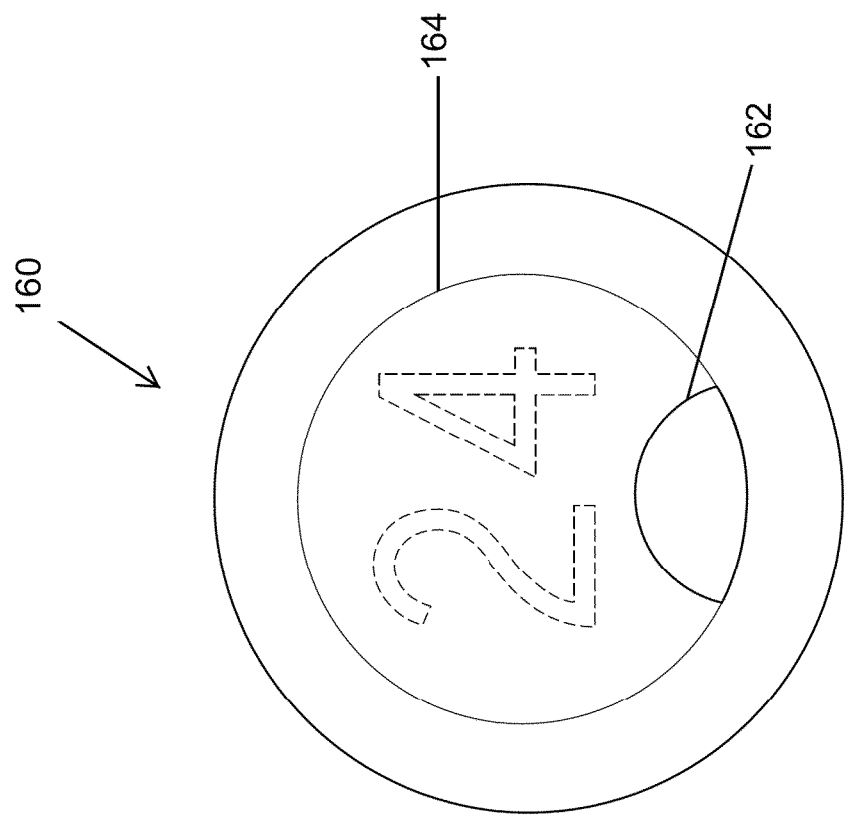
FIG. 35 is a front view of an exemplary timer.
Figure 34:
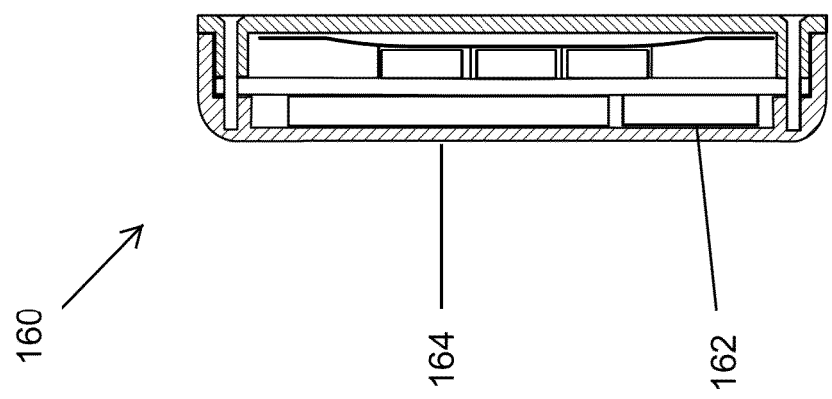
FIG. 34 is a cross-sectional side view of the timer.

FIG. 32 is a cross-sectional perspective view of the centerpiece connector 140, showing a screen filter 142 therein. The screen filter 142 may be used to prevent particles (e.g. coffee grounds or tea leaves) from transferring between the brew chamber 120 and the extract chamber 150. As shown, the screen filter 142 is offset from the outer rim by an annular shoulder 144 that is preferably located between the open ends (openings) of the centerpiece connector 140. This configuration prevents the extract from running down the sides of the extract chamber 150. Instead, the extract pours directly into the extract chamber 150. An exemplary thread assembly on both the extract chamber 150 and the centerpiece connector 140 allow interconnection therebetween. Preferably, there is a similar thread assembly for interconnecting the centerpiece connector 140 with the brew chamber 120. FIG. 33 shows some of the preferred components of the centerpiece connector 140 including a sealing mechanism (shown as a universal standard size O-ring 146) inserted inside both the top and the bottom of centerpiece connector 140.

FIG. 33 also shows a preferred timer 160 that is positioned in a designated socket 148 on the side of the centerpiece connector 140. The timer 160 is shown in additional detail in FIGS. 34 and 35. The timer may include components such as a circuit board, a battery, and known timer components. The operation of the timer 160 is preferably very simple, although operational steps could be adapted for intended use. One feature of the timer 160, however, is that it may count down for extended periods of time (e.g. twenty-four hours). For example, when a user resets the timer 160 (perhaps by pressing a button 162), the digital time indicator screen 164 of the timer 160 displays a "24." The timer 160 then counts down the time (to "0") until the brewing stage is complete. Alternatively or in addition, the timer 160 may count up (e.g. from "0" to "24") for extended periods of time. The timer 160 may be assembled to the centerpiece connector 140 with bayonet assembly. The centerpiece connector 140 may be removable for cleaning purposes.

Figure 36:
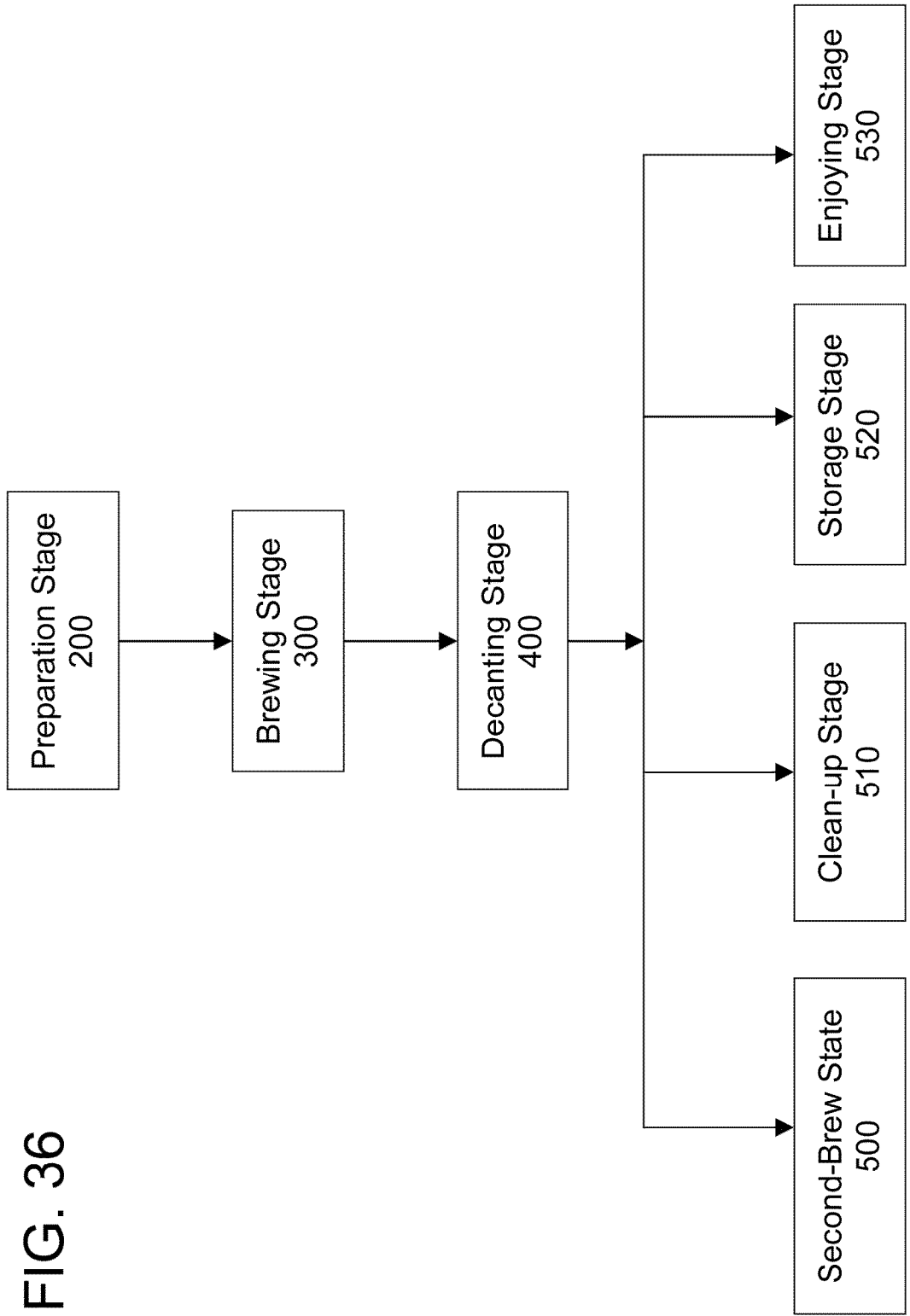
FIG. 36 is a flowchart showing various exemplary stages of the second exemplary cold brew coffee apparatus.
Figure 50:
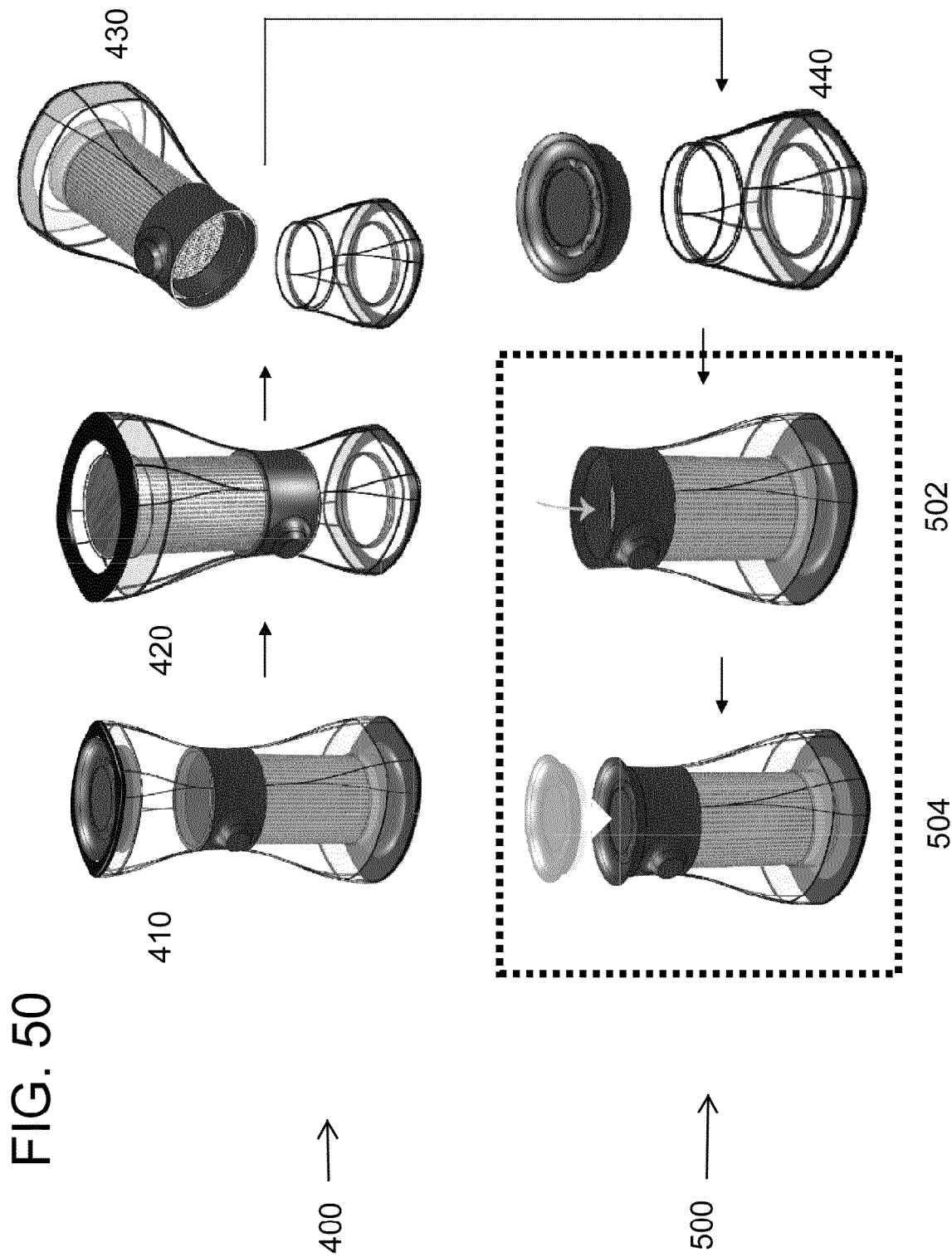
FIG. 50 is a graphical flowchart showing exemplary steps for the use of any of the second exemplary cold brew coffee apparatuses in a decanting stage and an optional second-brew stage.

FIG. 36 is a flowchart showing various exemplary stages of the second exemplary cold brew coffee apparatus 100. The basic stages are the preparation stage 200 (shown as 200a in FIG. 37, 200b in FIG. 39, and 200c in FIG. 44), the brewing stage 300, and the decanting stage 400 (FIG. 50). After the decanting stage 400, there are four additional stages that can be used in various configurations. For example, there is the second-brew stage 500 (FIG. 50), the clean-up stage 510 (FIGS. 51 and 52), the storage stage 520, and the enjoying stage 530. Some of these stages are highly dependent on the type of filter that is used. The three filters shown and discussed are a direct-grind filter 170 (FIG. 38) used in preparation stage 200a, a handled-pod filter 180 (FIGS. 40-43) used in preparation stage 200b, and a tabbed-pod filter 190 (FIGS. 45-49) used in preparation stage 200c.

Figure 37:
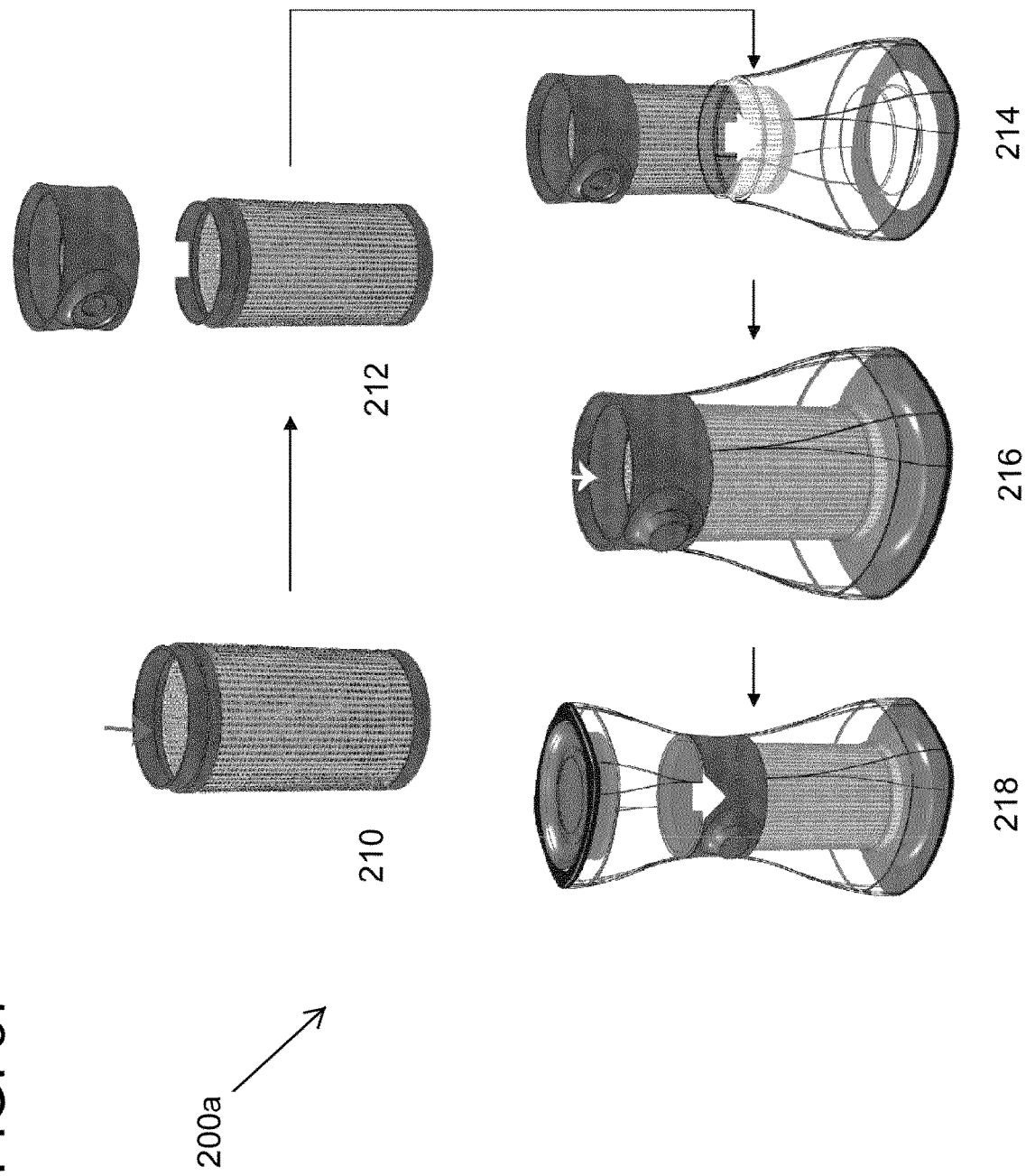
FIG. 37 is a graphical flowchart showing exemplary steps for the use of a direct-grind filter version of the second exemplary cold brew coffee apparatus in a preparation stage.
Figure 38:
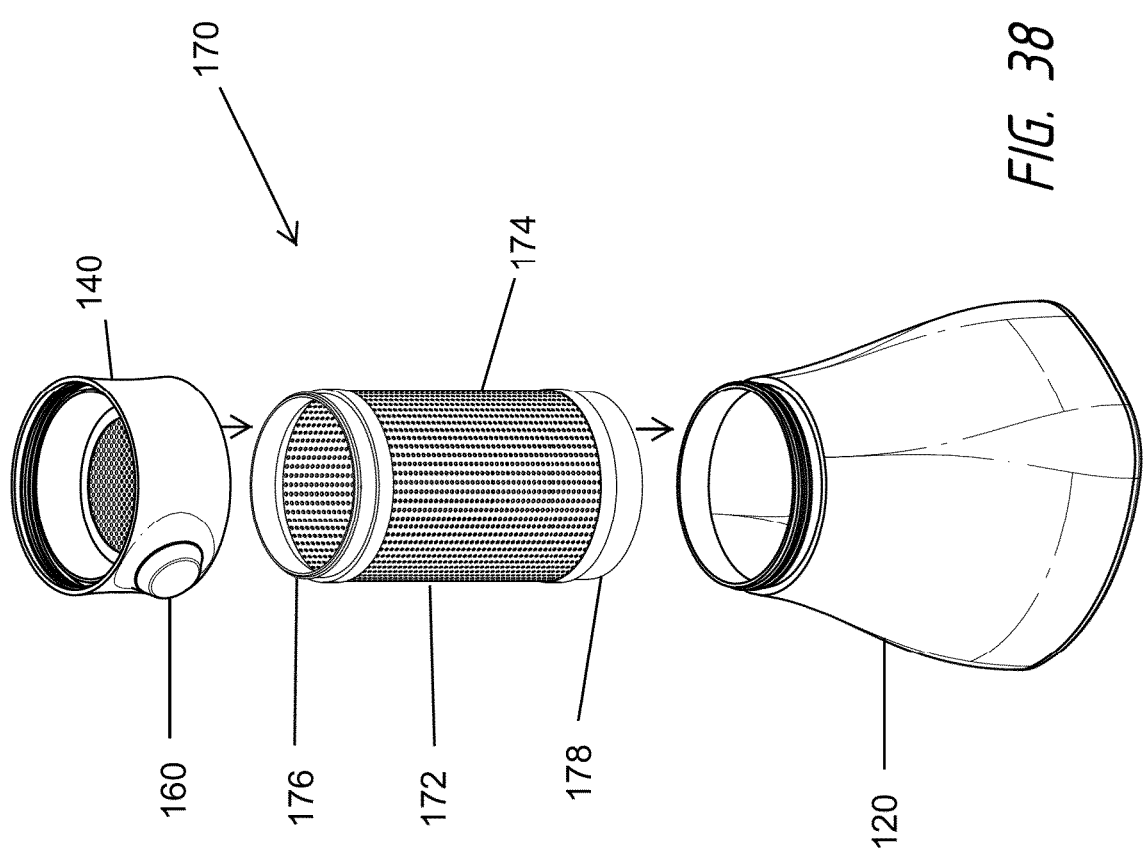
FIG. 38 is an exploded view of the brew chamber of the metal filter version of the second exemplary cold brew coffee apparatus.

FIG. 37 shows exemplary steps for the use of a direct-grind filter version of the preparation stage 200a using the direct-grind filter 170. The direct-grind filter 170, as shown in FIG. 38 includes a metal (or other known or yet to be discovered material that can be used repetitively, is not affected by prolonged exposure to coffee grounds or water, and does not leach chemicals) water-permeable exterior peripheral surface 172 with apertures 174 therein that are small enough to prevent the grinds from escaping. The direct-grind filter 170 preferably has an open top end 176 and an at least substantially closed bottom end 178 (although the bottom end 178 may have perforations therein). The open top end 176 is associatable with the centerpiece connector 140 and may at least partially suspend the direct-grind filter 170. Because the direct-grind filter 170 is water permeable, cold brew infusion can occur when water in the brew chamber 120 interior volume passes through the water-permeable direct-grind filter 170 and soaks coffee grounds within the interior volume of the direct-grind filter 170 to form a soluble coffee extract.

The preparation stage 200a steps shown in FIG. 37 include the following: a pouring step 210 in which coffee grinds are poured into the direct-grind filter 170; a centerpiece connector connection step 212 in which the centerpiece connector 140 is attached to the open top end 176 of the direct-grind filter 170; an insertion step 214 in which the direct-grind filter 170 is inserted into the brew chamber 120, and the centerpiece connector 140 (as shown in FIGS. 32 and 33) is associated (e.g. screwed) with the brew chamber 120, a seal being formed therebetween; a water pouring step 216 in which water is poured into the open top end 176 of the direct-grind filter 170, the water flowing through the water-permeable surface(s) into the brew chamber 120; and the closure step 218 in which either a cap 130 or the extract chamber 150 is attached to the brew chamber 120. The timer 160 is then set and the process enters the brewing stage 300.

Figure 39:
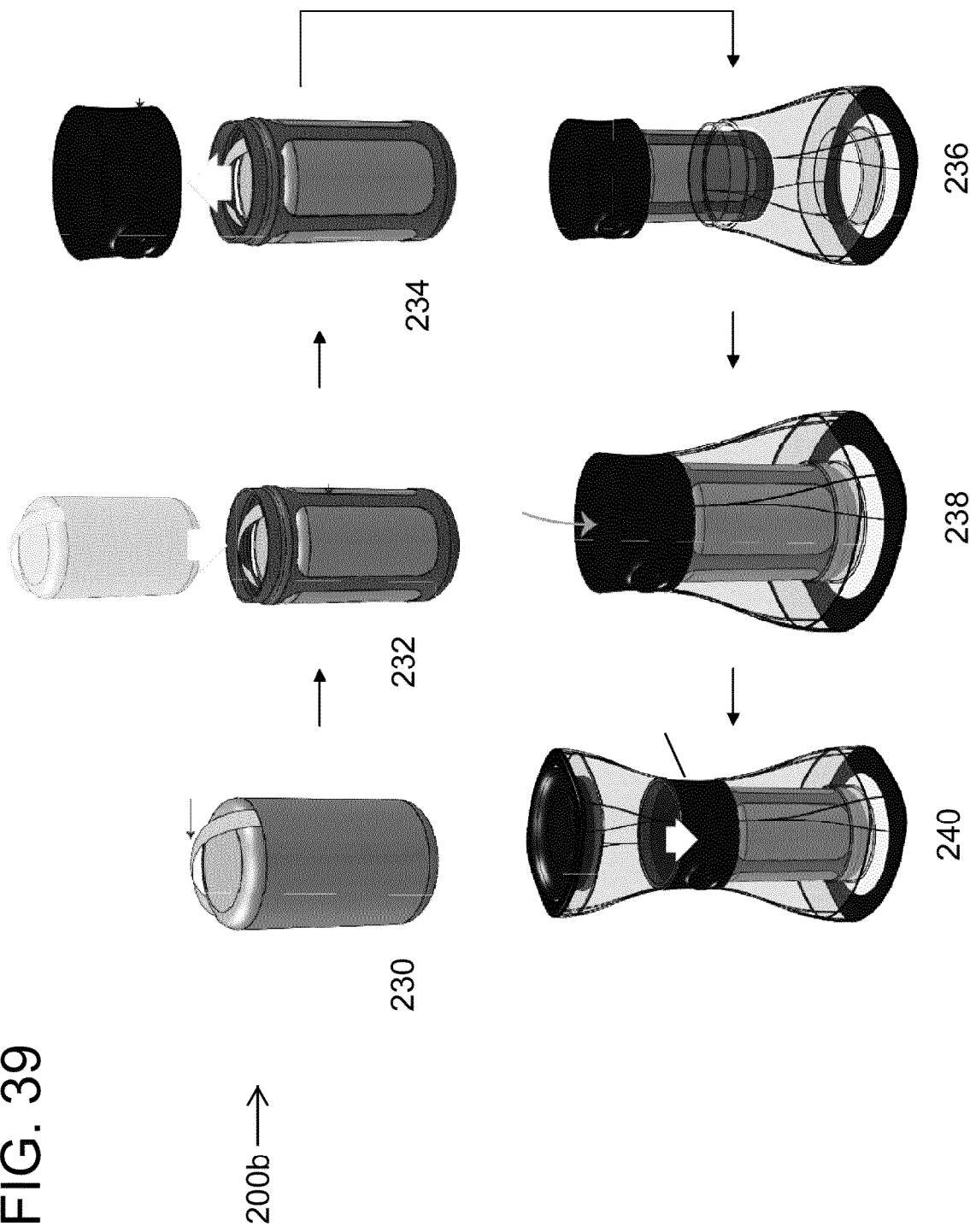
FIG. 39 is a graphical flowchart showing exemplary steps for the use of a handled-pod version of the second exemplary cold brew coffee apparatus in a preparation stage.

FIG. 39 shows exemplary steps for the use of a handled-pod filter version of the preparation stage 200b using the handled-pod filter 180. The handled-pod filter 180, as shown in FIGS. 40-43 may be used in conjunction with a filter frame. The filter frame may be made from metal (e.g. high quality stainless steel, a naturally anti-microbial material, or other known or yet to be discovered material that can be used repetitively, is not affected by prolonged exposure to coffee grounds or water, and does not leach chemicals). This filter frame may have a ring-shaped open top end and a bottom end (that may be ring shaped or may be a solid disk). A plurality of legs (shown as four) connect a ring-shaped open top end and a bottom end. The ring-shaped open top end is associatable with the centerpiece connector 140 and may at least partially suspend the handled-pod filter 180. The purpose of the filter frame is primarily to support the handled-pod filter 180.

The handled-pod filter 180, not the filter frame, prevents the grinds from escaping the handled-pod filter 180. The handled-pod filter 180 is preferably made from a water-permeable paper (similar to the paper from traditional coffee filters) or other material known or yet to be discovered suitable for this purpose. The handled-pod filter 180 is shown as having a substantially cylindrical body 182 with a radiused upper annular periphery 184 and a radiused lower annular periphery 186. A handle 188 spans the upper surface. It should be noted that alternative handled-pod filters could have alternative shapes. For example, the upper annular periphery and the lower annular periphery do not have to be radiused. The handled-pod filter 180 may be sold pre-filled or may be sold empty for user filling. Because the handled-pod filter 180 is water permeable, cold brew infusion can occur when water in the brew chamber 120 interior volume passes through the water-permeable handled-pod filter 180 and soaks coffee grounds within the interior volume of the handled-pod filter 180 to form a soluble coffee extract.

The preparation stage 200b steps shown in FIG. 39 include the following: a pod step 230 in which coffee grinds are poured into the handled-pod filter 180 or a pre-filled handled-pod filter 180 is obtained; a pod insertion step 232 in which the handled-pod filter 180 is inserted into a filter frame; a centerpiece connector connection step 234 in which the centerpiece connector 140 is attached to the open top end of the filter frame associated with the handled-pod filter 180; an insertion step 236 in which the filter frame and handled-pod filter 180 are inserted into the brew chamber 120, and the centerpiece connector 140 (as shown in FIGS. 32 and 33) is associated (e.g. screwed) with the brew chamber 120, a seal being formed therebetween; a water pouring step 238 in which water is poured through the handled-pod filter 180, the water flowing through the water-permeable surface(s) into the brew chamber 120; and the closure step 240 in which either a cap 130 or the extract chamber 150 is attached to the brew chamber 120. The timer 160 is then set and the process enters the brewing stage 300.

Figure 44:
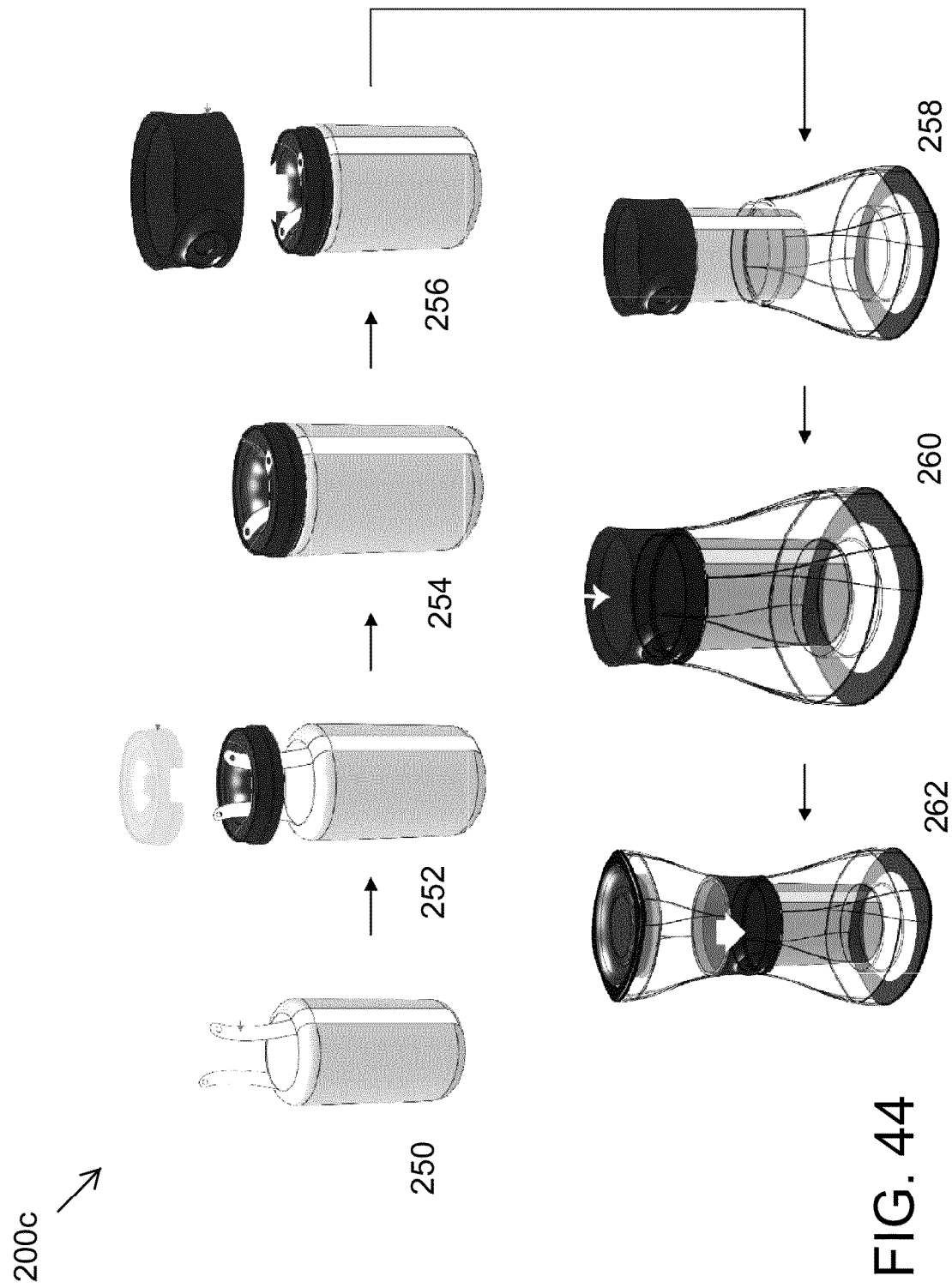
FIG. 44 is a graphical flowchart showing exemplary steps for the use of a tabbed-pod version of the second exemplary cold brew coffee apparatus in a preparation stage.

FIG. 44 shows exemplary steps for the use of a tabbed-pod filter version of the preparation stage 200c using the tabbed-pod filter 190. The tabbed-pod filter 190 (details of which are shown in FIGS. 45-48) may be used in conjunction with a pod lock 191 (as shown in FIG. 45). Because the pod lock 191 will not be soaking in the coffee grounds and water, the pod lock 191 may be made from material such as metal, plastic, rubber, other known or yet to be discovered material suitable for this intended purpose. The pod lock 191 is shown as being a "ring" having a top surface and a bottom surface. The lower annular surface of the pod lock 191 is adapted to substantially associate with the upper annular surface of the tabbed-pod filter 190. The upper annular surface of the pod lock 191 may have at least one "nub engager" 192 (shown as a bump) or other connector that can help secure the tabs 193 of the tabbed-pod filter 190 to the pod lock 191. The upper annular surface of the pod lock 191 is adapted to associate with the centerpiece connector 140. When the pod lock 191 is associated with the centerpiece connector 140, the tabbed-pod filter 190 may at least partially suspend the handled-pod filter 180.

The tabbed-pod filter 190 prevents the grinds from escaping the tabbed-pod filter 190. The tabbed-pod filter 190 is preferably made from a water-permeable paper (similar to the paper from traditional coffee filters) or other material known or yet to be discovered suitable for this purpose. The tabbed-pod filter 190 is shown as having a substantially cylindrical body 194 with a radiused upper annular periphery 195 and a radiused lower annular periphery 196. At least one tab 193 (shown as two tabs 193) projects from the upper annular periphery 195 of the tabbed-pod filter 190. Each of the projecting ends of the tabs 193 has at least one "hole engager" 197 (shown as a hole) or other connector that can help secure the tabs 193 of the tabbed-pod filter 190 to the "nub engager" 192 pod lock 191. The shown tabbed-pod filter 190 has a single strip that folds upward (e.g. U-shaped) so that its two ends form the two projecting ends of the tabs 193. This single strip construction is optional, although it does provide for good integrity of the tabbed-pod filter 190. It should be noted that alternative tabbed-pod filters could have alternative shapes. For example, the upper annular periphery and the lower annular periphery do not have to be radiused. The tabbed-pod filter 190 may be sold pre-filled or may be sold empty for user filling. Because the tabbed-pod filter 190 is water-permeable, cold brew infusion can occur when water in the brew chamber 120 interior volume passes through the water-permeable tabbed-pod filter 190 and soaks coffee grounds within the interior volume of the tabbed-pod filter 190 to form a soluble coffee extract.

The preparation stage 200c steps shown in FIG. 44 include the following: a pod step 250 in which coffee grinds are poured into the tabbed-pod filter 190 or a pre-filled tabbed-pod filter 190 is obtained; a pod lock insertion step 252 in which the tabs 193 of the tabbed-pod filter 190 are inserted into a pod lock 191; a pod lock engagement step 254 in which the "hole engagers" 197 of the tabs 193 are attached or secured to the "nub engagers" 192 of the pod lock 191; a centerpiece connector connection step 256 in which the centerpiece connector 140 is attached to the open top end of the pod lock 191 associated with the tabbed-pod filter 190; an insertion step 258 in which the pod lock 191 and tabbed-pod filter 190 are inserted into the brew chamber 120, and the centerpiece connector 140 (as shown in FIGS. 32 and 33) is associated (e.g. screwed) with the brew chamber 120, a seal being formed therebetween; a water pouring step 260 in which water is poured through the tabbed-pod filter 190, the water flowing through the water-permeable surface(s) into the brew chamber 120; and the closure step 262 in which either a cap 130 or the extract chamber 150 is attached to the brew chamber 120. The timer 160 is then set and the process enters the brewing stage 300.

As shown in FIG. 36, after the preparation stage 200 is a brewing stage 300. The brewing stage during which cold brew infusion takes place lasts approximately twenty-four hours. (The actual range of brewing is approximately twelve hours to seventy-two hours.) This duration, however, is variable depending on factors including, but not limited to the type of grinds, the quantity of grinds, the user's preference, whether it is a first brew or a second brew, and many other factors. As shown in FIG. 36, after the brewing stage 300 is a decanting stage.

FIG. 50 is a graphical flowchart showing exemplary steps for the use of any of the second exemplary cold brew coffee apparatuses 100 in a decanting stage 400 and an optional second-brew stage 500. As shown, these steps may include the following: a brew ready step 410 in which the brew is ready; a flip stage 420 in which the second exemplary cold brew coffee apparatus 100 is turned upside down (180 degrees on its y-axis) so that extract from the brew chamber 120 is transferred into the extract chamber 150, noting the annular shoulder 144 prevents the extract from running down the sides of the extract chamber 150; a transfer step 430 in which the brew chamber 120 and centerpiece detach from the extract chamber 150 with the extract remaining in the extract chamber 150; a closure step 440 in which a cap 130 may be placed on the extract chamber 150.

FIG. 50 continues with an optional second-brew stage 500. As shown, these steps may include the following: a refill step 502 in which water is poured through the filter; and a step 504 in which a cap 130 is attached to the top of the brew chamber 120.

Figures 51, 52:
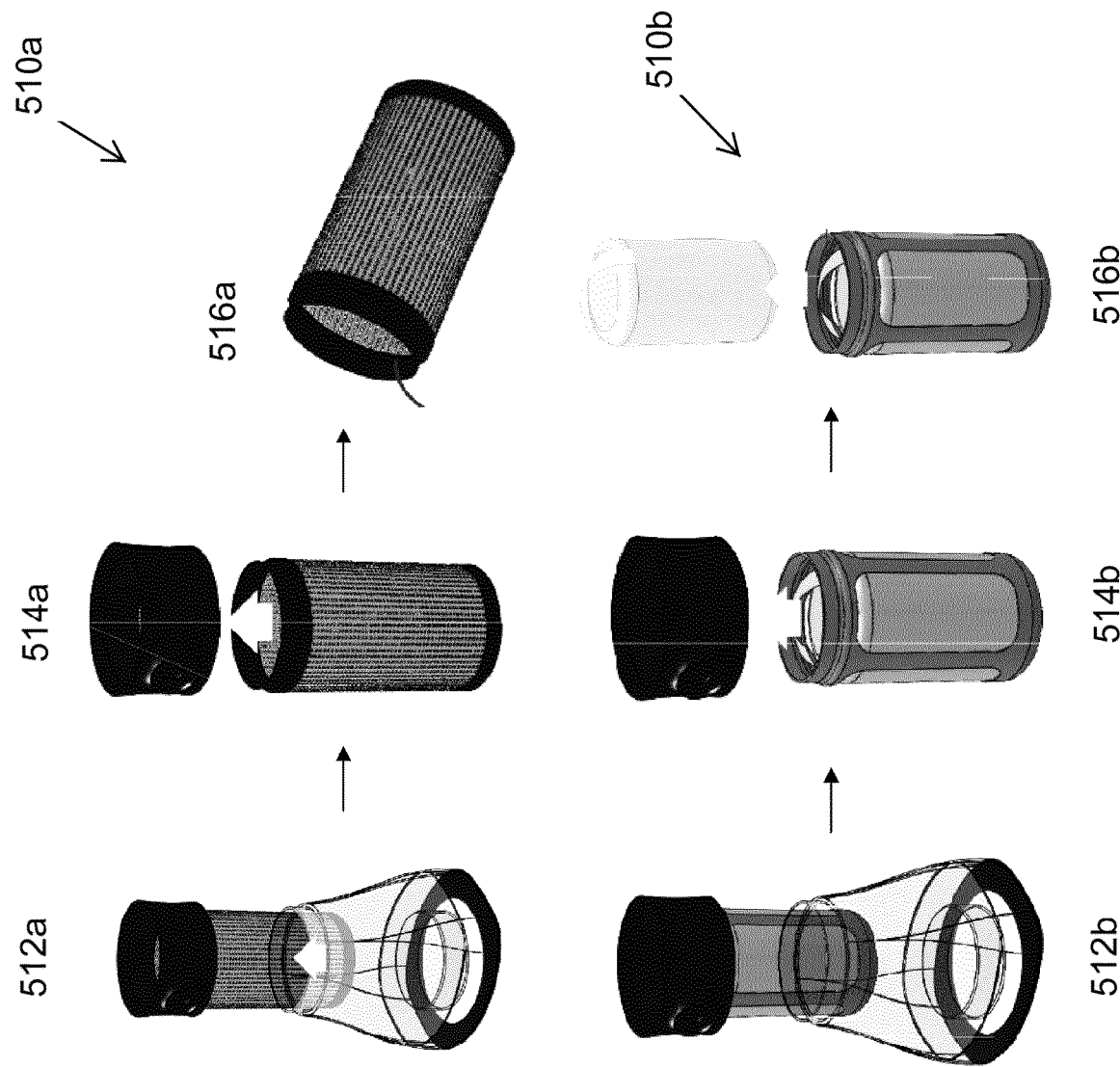
FIG. 51 is a graphical flowchart showing exemplary steps for the use of direct-grind filter version of the second exemplary cold brew coffee apparatus in a clean-up stage.
FIG. 52 is a graphical flowchart showing exemplary steps for the use of either of the pod versions of the second exemplary cold brew coffee apparatus in a clean-up stage.

FIG. 51 is a graphical flowchart showing exemplary steps for the use of a direct-grind filter version of the second exemplary cold brew coffee apparatus 100 in a clean-up stage 510a. As shown, these steps may include the following: a retraction step 512a in which the centerpiece connector 140 and the direct-grind filter 170 are detached and retracted from the brew chamber 120; a separation step 514a in which the centerpiece connector 140 is separated from the direct-grind filter 170; and an emptying step 516b in which the direct-grind filter 170 is tilted or upturned to remove the brewing particles (grinds) from the direct-grind filter 170.

FIG. 52 is a graphical flowchart showing exemplary steps for the use of either of the pod versions (the versions using the handled-pod filter 180 or the tabbed-pod filter 190) of the second exemplary cold brew coffee apparatus 100 in a clean-up stage 510b. As shown, these steps may include the following: a retraction step 512b in which the centerpiece connector 140 and the pod filter 180, 190 are detached and retracted from the brew chamber 120; a separation step 514b in which the centerpiece connector 140 is separated from the pod filter 180, 190; an "emptying or unlocking" step 516b in which the pod filter 180, 190 is separated from the filter frame or the pod lock 191 and the pod filter 180, 190 (and the brewing particles (grinds) therein) may be dealt with separately (e.g. by disposal or recycling).

FIG. 36 shows a storage stage 520 and enjoying stage 530. These stages relate to some of the many advantages of the systems described herein. Accordingly, the following advantages are relevant to these stages:
Cold-brewed coffee has fabulous taste.
Cold-brewed coffee has less acid than hot-brewed coffee.
  Certified lab tests were conducted by Intertek, a top tier global lab services provider. Lab test results showed 69.6% less acid.
Cold-brewed coffee has less caffeine than hot-brewed coffee.
Cold-brewed coffee extract can be stored in the refrigerator for up to two weeks. This means that cold-brewed coffee is never wasted or thrown out.
The systems described herein require no external power, electricity, or batteries to operate.

Definitions

The following definitions are relevant to the cold brew beverage brewing systems described herein. Please note that the terms and phrases may have additional definitions and/or examples throughout the specification. Where otherwise not specifically defined, words, phrases, and acronyms are given their ordinary meaning in the art.
  The term "associated" is defined to mean integral or original, retrofitted, attached, connected (including functionally connected), positioned near, and/or accessible by.
  It should be noted that relative terms (e.g. primary and secondary) are meant to help in the understanding of the technology and are not meant to limit the scope of the invention. Similarly, unless specifically stated otherwise, the terms "first," "second," and "third" are meant solely for purposes of designation and not for order or limitation. For example, the specific steps may be performed in an alternative order.
  It should be noted that some terms used in this specification are meant to be relative. For example, the terms "upper" and "lower" are meant to be relative and, if the system was rotated, the terms would change accordingly. Similarly, the term "front" is meant to be relative to the term "back" and the term "top" is meant to be relative to the term "bottom." Rotation of the system or component that would change the designation might change the terminology, but not the concept.
  The terms "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.
  Unless specifically stated otherwise, the term "exemplary" is meant to indicate an example, representative, and/or illustration of a type.
  It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.
  Any element in a claim that does not explicitly state "means for" performing a specified function, or "step for" performing a specific function, is not to be interpreted as a "means" or "step" clause as specified in 35 U.S.C. Sec. 112, paragraph 6. In particular, the use of "step of" in the claims herein is not intended to invoke the provisions of 35 U.S.C. Sec. 112, paragraph 6.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A cold brew coffee apparatus comprising:
   (a) a brew chamber having a brew chamber interior volume, a brew chamber enclosed end, and a brew chamber opening remote from said brew chamber enclosed end;
   (b) a filter providing a water-permeable barrier, said filter having a filter enclosed end and a filter opening, said filter opening remote from said filter enclosed end, said filter defining a filter interior volume, said filter sized to fit within said brew chamber interior volume, said filter positionable within said brew chamber such that it divides said filter interior volume from the remainder of said brew chamber interior volume, said filter opening associatable with said brew chamber enclosed end; and
   (c) said cold brew coffee apparatus sealed so that it is invertible when assembled.

2. The cold brew coffee apparatus of claim 1, said brew chamber being an integral unit.

3. The cold brew coffee apparatus of claim 1, said filter opening being wider than said filter enclosed end.

4. The cold brew coffee apparatus of claim 1, said filter opening being wider than said filter enclosed end.

5. The cold brew coffee apparatus of claim 1, said filter having a frame encasing a water-permeable barrier.

6. The cold brew coffee apparatus of claim 1, said filter having an extruded frame encasing a water-permeable barrier.

7. The cold brew coffee apparatus of claim 1, said filter further comprising at least one connecting member at least substantially spanning the distance between said enclosed end and said filter opening.

8. The cold brew coffee apparatus of claim 1, said filter further comprising a plurality of connecting members at least substantially spanning the distance between said enclosed end and said filter opening.

9. The cold brew coffee apparatus of claim 1, said filter further comprising a plurality of connecting members at least substantially spanning the distance between said enclosed end and said filter opening, said plurality of connecting members at least partially defining a plurality of windows of filtering material.

10. The cold brew coffee apparatus of claim 1, wherein cold brew infusion occurs when water in said brew chamber interior volume passes through said water-permeable barrier and soaks coffee grounds within said filter interior volume to form a soluble coffee extract.

11. A cold brew coffee apparatus comprising:
   (a) a brew chamber having a brew chamber interior volume, a brew chamber enclosed end, and a brew chamber opening remote from said brew chamber enclosed end;
   (b) an extract chamber having an extract chamber interior volume, an extract chamber bottom surface, and an extract chamber opening remote from said extract chamber bottom surface;
   (c) a centerpiece connector having a centerpiece connector first opening end and a centerpiece connector second opening end;
   (d) said cold brew coffee apparatus having an hourglass shape when said brew chamber is attached to said centerpiece connector first opening end and said extract chamber is attached to said centerpiece connector second opening end; and
   (e) a filter providing a water-permeable barrier, said filter defining a filter interior volume, said filter sized to fit within said brew chamber interior volume, said filter positionable within said brew chamber such that it divides said filter interior volume from the remainder of said brew chamber interior volume.

12. The cold brew coffee apparatus of claim 11, said brew chamber being an integral unit.

13. The cold brew coffee apparatus of claim 11, said cold brew coffee apparatus is sealed so that it is invertible when assembled.

14. The cold brew coffee apparatus of claim 11, said filter having a filter enclosed end and a filter opening, said filter opening remote from said filter enclosed end, said filter opening being wider than said filter enclosed end.

15. The cold brew coffee apparatus of claim 11, said filter having a filter enclosed end and a filter opening, said filter opening remote from said filter enclosed end, said filter opening associatable with said brew chamber enclosed end.

16. The cold brew coffee apparatus of claim 11, said filter having a filter enclosed end and a filter opening, said filter opening remote from said filter enclosed end, said filter opening being wider than said filter enclosed end, said filter opening associatable with said brew chamber enclosed end.

17. The cold brew coffee apparatus of claim 11, said filter having a frame encasing a water-permeable barrier.

18. The cold brew coffee apparatus of claim 11, said filter having an extruded frame encasing a water-permeable barrier.

19. The cold brew coffee apparatus of claim 11, wherein cold brew infusion occurs when water in said brew chamber interior volume passes through said water-permeable barrier and soaks coffee grounds within said filter interior volume to form a soluble coffee extract.

\* \* \* \* \*